US012658949B2

(12) United States Patent
Daruwalla

(10) Patent No.: US 12,658,949 B2
(45) Date of Patent: Jun. 16, 2026

(54) METHODS AND DEVICES TO CONTROL RADIATED SPURIOUS EMISSION IN RF ANTENNA SWITCHES

(71) Applicant: pSemi Corporation, San Diego, CA (US)

(72) Inventor: Parvez Daruwalla, San Diego, CA (US)

(73) Assignee: PSEMI CORPORATION, San Diego, CA (US)

( * ) Notice: Subject to any disclaimer, the term of this patent is extended or adjusted under 35 U.S.C. 154(b) by 243 days.

(21) Appl. No.: 18/477,244

(22) Filed: Sep. 28, 2023

(65) Prior Publication Data

US 2024/0113734 A1 Apr. 4, 2024

Related U.S. Application Data

(60) Provisional application No. 63/378,016, filed on Sep. 30, 2022.

(51) Int. Cl.
*H04B 1/00* (2006.01)
*H04B 1/04* (2006.01)
*H04B 1/66* (2006.01)

(52) U.S. Cl.
CPC ......... *H04B 1/0078* (2013.01); *H04B 1/0458* (2013.01); *H04B 1/66* (2013.01)

(58) Field of Classification Search
CPC ...... H04B 1/0078; H04B 1/0458; H04B 1/66; H04B 1/401; H04B 1/18; H04B 7/0602; H03K 17/687
USPC ...................................................... 455/552.1
See application file for complete search history.

(56) References Cited

U.S. PATENT DOCUMENTS

| | | |
|---|---|---|
| 2012/0326680 A1 | 12/2012 | Burns et al. |
| 2014/0167834 A1* | 6/2014 | Stuber ................ H10D 30/6759 |
| | | 327/382 |
| 2014/0220909 A1 | 8/2014 | Kunishi et al. |
| 2018/0083665 A1* | 3/2018 | Sugawara ................ H03H 7/38 |
| 2021/0234246 A1 | 7/2021 | Ganesan |

OTHER PUBLICATIONS

International Search Report and Written Opinion issued for International Application No. PCT/US2023/075351 filed on Sep. 28, 2023 on behalf of pSemi Corporation. Mail Date: Jan. 22, 2024. 12 pages.

* cited by examiner

*Primary Examiner* — Tanmay K Shah
(74) *Attorney, Agent, or Firm* — Steinfl + Bruno LLP

(57) ABSTRACT

Methods and devices to control radiated spurious emission (RSE) in an RF antenna switch are presented. The RF antenna switch includes a through stack that includes at least one regular N-type FET transistor and a plurality of intrinsic N-type FET transistors, and a shunt stack that includes a plurality of intrinsic N-type FET transistors. During an inactive mode of operation, the regular transistor turns OFF to present a high impedance. The RF antenna switch includes a termination stack having a plurality of regular P-type FET transistors that are activated during the inactive mode to present a termination impedance to the antenna. A bias signal generator that remains partially active during the inactive mode of operation to generate positive and negative control voltages having magnitudes that are sufficiently high to maintain ON/OFF control of the transistors of the stacks.

21 Claims, 14 Drawing Sheets

METHODS AND DEVICES TO CONTROL RADIATED SPURIOUS EMISSION IN RF ANTENNA SWITCHES

CROSS REFERENCE TO RELATED APPLICATIONS

The present application claims priority to and the benefit of U.S. Provisional Patent Application Ser. No. 63/378,016 entitled "Methods and Devices to Control Radiated Spurious Emission in RF Antenna Switches", filed on Sep. 30, 2022, the disclosure of which is incorporated herein by reference in its entirety.

TECHNICAL FIELD

The present disclosure is related to radio frequency (RF) switches, and more particularly to methods and devices to control radiated spurious emission (RSE) in RF antenna switches comprising FET switch stacks.

BACKGROUND

FIG. 1 shows simplified portions of two RF frontend systems (100, 200) in close proximity of one another. Each such system may be configured to transmit and/or receive RF signals through a respective antenna (160, 260). A transmit or receive RF signal may be selectively coupled through specific plurality of RF processing paths via a respective antenna switch (150, 250) that, as shown in FIG. 1, is coupled to the antenna (160, 260) at a respective common port (AP, e.g., a pole) of the antenna switch (150, 250). Under control of respective control signals (CTL1, CTL2), a plurality of throws (S1, S2, . . . , Sk) of the respective antenna switch (150, 250) may in turn couple the transmit or receive RF signal to the plurality of RF processing paths that may be defined, for example, by respective filters (141, 142, . . . , 14k, e.g., part of duplexers). Each RF frontend system (100, 200) may include a signal aware main processing unit (120, 220, e.g., transceiver) that may be configured, for example, to further process and/or control (e.g., through CTL1, CLT2) RF signal flow through the RF frontend systems (100, 200). It should be noted that the two RF frontend systems (100, 200) may be part of a same communication device (e.g., handheld device, cellular phone) or of different communication devices.

Devices such as RF frontend systems (100, 200) may be designed to reduce interference with surrounding communication devices or systems by way of reducing/minimizing spurious RF emissions while being active (e.g., transmit and/or receive) or inactive (e.g., no transmit and no receive). Some communication standards may even require system manufacturers and integrators to follow specifications aimed at reducing interference, including, for example, interference related to radiated spurious emission (RSE).

Radiated spurious emission (RSE) of the RF frontend system (100) is schematically and simplistically shown in FIG. 1 as an RF signal, $RF_{12}$, that is transmitted (e.g., radiated) through the antenna (160) responsive to an RF signal, $RF_2$, generated by the RF frontend (200). When the RF signal, $RF_2$, is generated by the RF frontend (200) and transmitted through the antenna (260), the antenna (160) of the RF frontend (100) may receive an attenuated amount of the RF signal, $RF_2$, that is based on relative proximity of the two antennae (160, 260). In turn, the RF signal, $RF_2$, received through the antenna (160) may couple to the common port AP of the antenna switch (150) and be subjected to internal impedances presented by various conduction paths internal to the antenna switch (150). In turn, mismatches between such internal impedances, and/or between such internal impedances and an impedance of a conduction path between the antenna (160) and the common port AP, may engender reflections of the received RF signal, $RF_2$, that may combine to generate the RF signal $RF_{12}$ that is transmitted/radiated through the antenna (160). The RF signal $RF_{12}$ may include harmonics, intermodulation products and/or frequency conversion products of the RF signal $RF_2$ generated by the RF frontend system (200).

Although the antenna switch (150) may be designed to sufficiently reduce/minimize RSE during an active mode of operation of the RF frontend system (100) wherein the internal impedances of the antenna switch (150) are known, during an inactive mode of operation of the RF frontend system (100), the internal impedances of the antenna switch (150) may be unknown and therefore cause an elevated RSE that is beyond a desired minimum level. A motivation of the present teachings is to control and maintain the RSE within a desired minimum level during the active and inactive modes of operation of an RF frontend communication system.

SUMMARY

According to a first aspect of the present disclosure, a radio frequency (RF) antenna switch is presented, comprising: a first switch element coupled between a common port of the RF antenna switch and a first throw of the RF antenna switch, the first switch element comprising: a through stack comprising a plurality of N-type FET transistors arranged in series connection, the through stack coupled between the common port and the first throw; and a shunt stack comprising a plurality of N-type FET transistors arranged in series connection, the shunt stack coupled between the first throw and a reference ground, and a bias signal generation circuit comprising at least one charge pump, the bias signal generator configured to generate positive and negative bias voltages based on a positive supply voltage, wherein the RF antenna switch is configured to operate according to an active mode and an inactive mode, the inactive mode defining a low power consumption mode of the RF antenna switch, control voltages applied to the first switch element during the active mode comprise positive and negative voltages having the respective magnitudes of the positive and negative bias voltages, the control voltages applied to the first switch element during the inactive mode comprise positive and negative voltages having respective magnitudes that are greater than zero and smaller than the respective magnitudes of the positive and negative bias voltages, and during the inactive mode, the at least one charge pump is inactive.

According to a second aspect of the present disclosure, a radio frequency (RF) antenna switch is presented, comprising: a first switch element coupled between a common port of the RF antenna switch and a first throw of the RF antenna switch, the first switch element comprising: a through stack comprising a plurality of intrinsic N-type FET transistors and at least one regular N-type FET transistor arranged in series connection, the through stack coupled between the common port and the first throw; and a shunt stack comprising a plurality of intrinsic N-type FET transistors arranged in series connection, the shunt stack coupled between the first throw and a reference ground.

According to a third aspect of the present disclosure, a radio frequency (RF) antenna switch is presented, comprising: a first switch element coupled between a common port of the RF antenna switch and a first throw of the RF antenna switch, the first switch element comprising: a through stack comprising a plurality of intrinsic N-type FET transistors arranged in series connection, the through stack coupled between the common port and the first throw; and a shunt stack comprising a plurality of intrinsic N-type FET transistors arranged in series connection, the shunt stack coupled between the first throw and a reference ground, and a termination stack comprising a plurality of regular P-type FET transistors arranged in series connection, the termination stack coupled between the common port and the reference ground.

Further aspects of the disclosure are provided in the description, drawings and claims of the present application.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

Like reference numbers and designations in the various drawings indicate like elements.

DETAILED DESCRIPTION

As used herein, the expression "active", "active state", "active mode", and "active mode of operation" are synonymous and refer to a mode of operation that enables full functionality of a circuit or system, such as a RF communication/frontend system and/or one or more elements thereof, such as an RF antenna switch. A goal of an active state may be reducing any delays in processing/generating of a signal at a cost of a relatively high-power consumption. Accordingly, and as an example, when the RF antenna switch (e.g., 150) of the RF frontend system (100) of FIG. 1 is active, then all (internal) elements of the RF antenna switch (150) and respective drivers/circuits that control (e.g., generate CTL1 signal) the RF antenna switch (150), are active and ready for transmitting and/or receiving of an RF signal through the RF antenna (160) with minimum delay.

As used herein, the expression "inactive", "inactive state", "inactive mode", "inactive mode of operation", "standby", "standby state", "standby mode", "low power mode" and "standby mode of operation" are synonymous and refer to a mode of operation that disables full functionality of a circuit or system, such as a RF communication/frontend system and/or one or more elements thereof, such as an RF antenna switch. A goal for an inactive state may be reducing power consumption at the cost of delays in processing/generating of signal incurred when transitioning to the active mode. Accordingly, and as an example, when the RF antenna switch (e.g., 150) of the RF frontend system (100) of FIG. 1 is inactive or in standby, then the respective drivers/circuits that control (e.g., generate CTL1) the antenna switch (150) can be inactive for low power consumption.

Reducing power consumption may be considered a priority for battery operated handheld devices, and therefore more system manufacturers and integrators may resort to implementing inactive modes of operation in their devices. Accordingly, an inactive mode of operation can be considered as a low power mode (LPM) that may be defined by a strict requirement on current consumption in a system and/or one or more elements thereof. For a case of an RF antenna switch (e.g., 150, 250 of FIG. 1), current consumption in the inactive state may be restricted to be as low as 5 microamperes. To achieve such low current consumption, typical designs may disable operation of the driver circuits (e.g., bias signal generator of FIGS. 5A-5F later described) that generate control signals/voltages used to control operation of the RF antenna switch. By doing so, levels of the control signals/voltages (e.g., CTL1, CTL2 of FIG. 1) to the RF antenna switch may eventually reach to zero volts which in turn may cause internal devices (e.g., transistors, FETs shown in FIG. 2A) of the RF antenna switch to settle to states with impedances that in combination may cause the elevated RSE described above.

Figure 1:
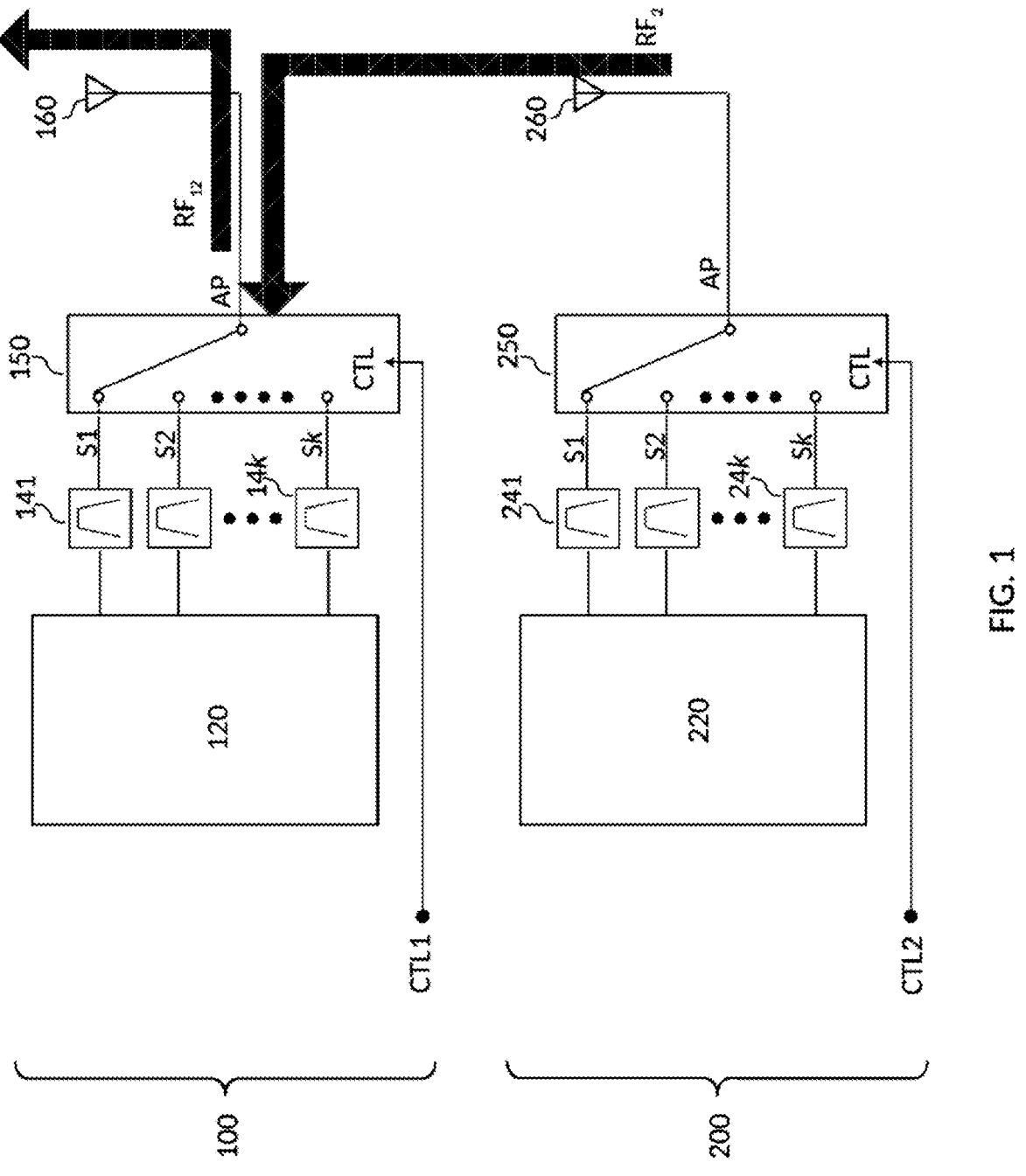
FIG. 1 shows simplified portions of two RF frontend systems in close proximity of one another.
Figure 2A:
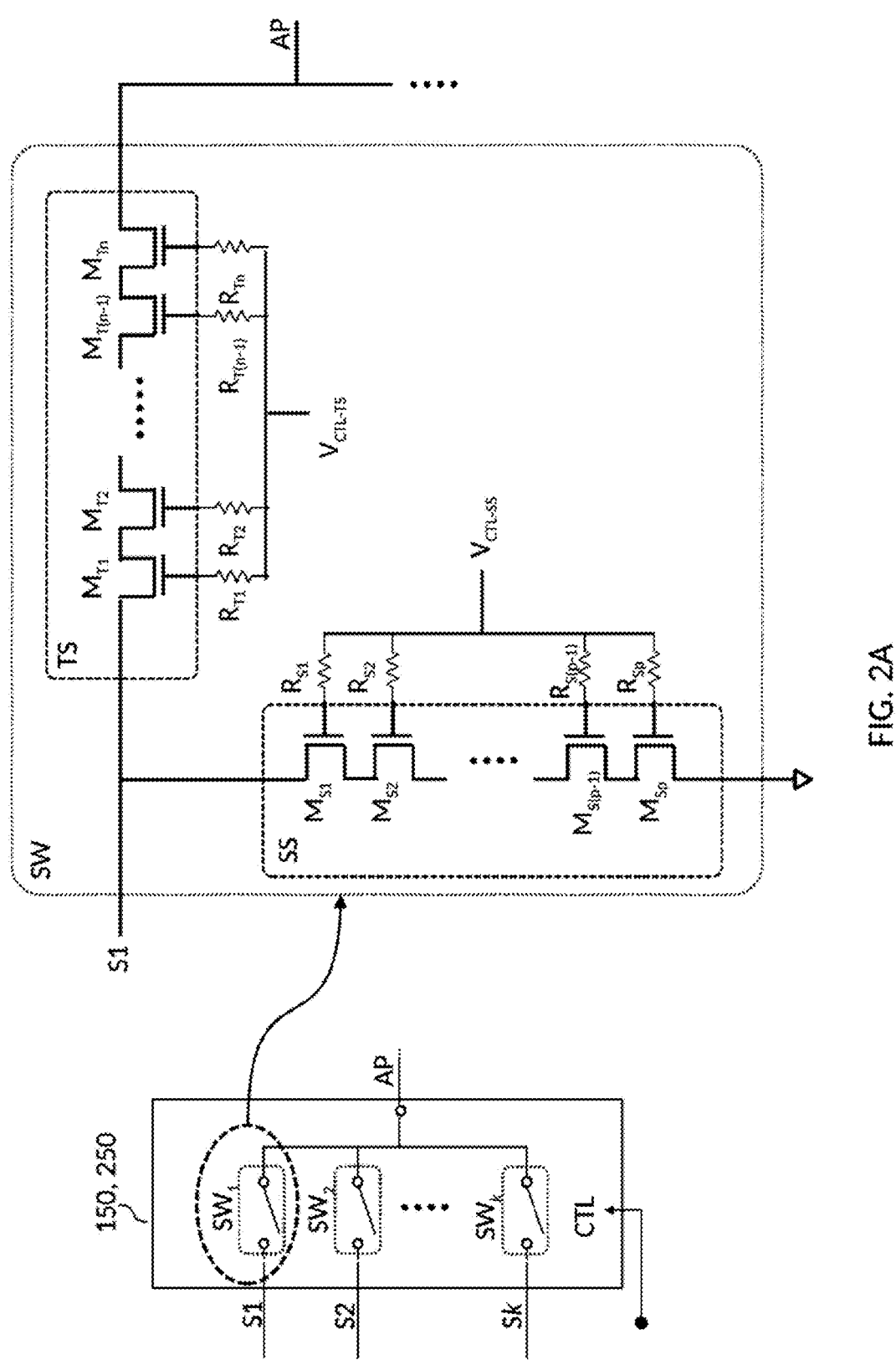
FIG. 2A shows details of an example RF antenna switch that can be used in each of the two RF frontends of FIG. 1.

FIG. 2A shows details of an example RF antenna switch element, SW, that can be used in an RF antenna switch, such as the RF antenna switches (150, 250) of FIG. 1. As shown on the left of FIG. 2A, implementation of an RF antenna switch (e.g., 150, 250) may be provided via a plurality of single-pole single-throw switches (e.g., switch elements, $SW_1$, $SW_2$, . . . , $SW_k$) having respective poles connected/coupled to the common port, AP, of the RF antenna switch, and respective throws connected/coupled to the plurality of throws (S1, S2, . . . , Sk) of the RF antenna switch. On the right of FIG. 2A, details of the switch element, SW, that can be used to implement each of the switches (SW₁, SW₂, . . . , SWₖ), including switch SW₁, is shown.

As shown in FIG. 2A, the example switch element, SW, may include a through stack, TS, that is coupled between the common port, AP, and a respective throw (e.g., S₁) of the RF antenna switch (e.g., 150, 250), and a shunt stack, SS, that is coupled between the respective throw (e.g., S₁) of the RF antenna switch (e.g., 150, 250) and the reference ground. The through stack, TS, may include a plurality (e.g., n) of series connected FET transistors ($M_{T1}$, $M_{T2}$, . . . , $M_{Tn}$) whose gates are coupled to a (through stack) control signal, $V_{CTL\_TS}$, via a respective plurality of gate resistors ($R_{T1}$, $R_{T2}$, . . . , $R_{Tn}$), each such gate resistor in series connection with a respective transistor gate. Likewise, the shunt stack, SS, may include a plurality (e.g., p) of series connected FET transistors ($M_{S1}$, $M_{S2}$, . . . , $M_{Sp}$) whose gates are coupled to a (shunt stack) control signal, $V_{CTL\_SS}$, via a respective plurality of gate resistors ($R_{S1}$, $R_{S2}$, . . . , $R_{Sp}$), each such gate resistor in series connection with a respective transistor gate. ON and OFF states of the switch element, SW, may be based on and OFF states of the through stack, TS, and of the shunt stack, SS. It should be noted that other topologies for a switch element for use in an RF antenna switch may be possible via inclusion of one or more additional through stacks TS or shunt stacks SS (e.g., SS-TS-SS, etc.). Teachings according to the present disclosure may equally apply to such topologies.

With continued reference to FIG. 2A, each of the stacks, TS and SS, should be able to withstand a high voltage that corresponds to a highest expected (RF) voltage processed through the antenna switch (and therefore through the switch element SW). Accordingly, the numbers, n and p, of the respective series connected FET transistors ($M_{T1}$, $M_{T2}$, . . . , $M_{Tn}$) and ($M_{S1}$, $M_{S2}$, . . . , $M_{Sp}$) may be based on the high voltage and a corresponding voltage withstand capability of each of the FET transistors (e.g., the high voltage distributes/divides over the number of FET transistors). Because in typical switch designs same type (and size) of FET transistors may be used, and since both stacks TS and SS may be subjected to a same high voltage (e.g., during their OFF states), then in some nonlimiting implementations the number n may be equal to the number p.

With further reference to FIG. 2A, during the active mode of operation of the RF antenna switch, (e.g., 150, 250) to turn the switch element, SW, of FIG. 2A to the ON state (i.e., low impedance state, conduction state), the stack TS is turned ON and the stack SS is turned OFF, and to turn the switch element, SW, to the OFF state (i.e., high impedance state, isolation state), the stack TS is turned OFF and the stack SS is turned ON. States of the stacks, TS and SS, are provided via states of the respective FET transistors, ($M_{T1}$, $M_{T2}$, . . . , $M_{Tn}$) and ($M_{S1}$, $M_{S2}$, . . . , $M_{Sp}$), which in turn are controlled via the respective control signals, $V_{CTL\_TS}$ and $V_{CTL\_SS}$. During the active mode of operation, voltage levels of the control signals, $V_{CTL\_TS}$ and $V_{CTL\_SS}$, are (actively and deterministically) generated by a corresponding circuit (e.g., bias signal generator of FIG. 5A later described) to known levels that control each of the FET transistors, $M_{T1}$, $M_{T2}$, . . . , $M_{Tn}$, $M_{S1}$, $M_{S2}$, . . . , $M_{Sp}$, for operation in a known and desired state (e.g., ON or OFF, conduction or isolation, low impedance or high impedance, etc.). For example, assuming all the FET transistors of the stacks TS and SS are N-type FET transistors, then for turning ON such transistors, the control signals, $V_{CTL\_TS}$ and $V_{CTL\_SS}$, may apply a voltage level that is greater than a threshold voltage, $V_{TH}$, of the transistors to respective gates of the transistors, and for turning OFF such transistors, the control signals, $V_{CTL\_TS}$ and $V_{CTL\_SS}$, may apply a voltage level that is smaller than the threshold voltage, $V_{TH}$, of the transistors to respective gates of the transistors.

In some RF antenna switch designs, the FET transistors (e.g., FET transistor switch) used in the switch element, SW, of FIG. 2A, are N-type FET transistors. One reason for such choice of transistor type may be attributed to electron mobility in N-type doped silicon (electrons as majority carriers) which is substantially higher (e.g., by a factor of three or more) than hole mobility in P-type silicon (holes as majority carriers), which effectively can allow for a lower ON resistance ($R_{ON}$) for a given transistor size (e.g., ratio of width to length of the transistor). In other words, an RF switch element, such as the switch element, SW, of FIG. 2A, may be constructed with smaller size N-type FET transistors that consume less power and take less die area while providing a sufficiently low $R_{ON}$ (and a sufficiently less OFF capacitance).

The threshold voltage, $V_{TH}$, of a FET transistor may be considered as representing a gate-to-source voltage that when applied to the FET transistor puts the transistor at the limit between conduction (e.g., ON state, saturation region of operation) and non-conduction (e.g., OFF state, isolation, triode region of operation). Typical values of the $V_{TH}$ voltage of (regular) FET transistors (e.g., NMOS FETs) may be approximately (positive) 500 millivolts, or in a range from (positive) 450 millivolts to (positive) 650 millivolts (inverted/negative values for PMOS FETs). Furthermore, the farthest a FET transistor operates in its saturation region, the lower the $R_{ON}$ of the FET transistor is, which is beneficial when used as an RF transistor switch. In other words, for a case of an N-type FET transistor, it may be desirable to control the ON state of the FET transistor via a gate voltage that is substantially greater than the threshold voltage, $V_{TH}$, of the transistor. Similarly, to reduce current leakage in the OFF state of a FET transistor, it may be desirable to control the OFF state of the FET transistor via a gate voltage that is substantially smaller (including negative) than the threshold voltage, $V_{TH}$, of the transistor.

When reconciling the above characteristics of a (regular) N-type FET transistor used as an RF switch with a desire to operate/control the RF switch with low (control) voltages, in some RF antenna switch designs, intrinsic N-type FET transistors are used. As used in the present disclosure, a "regular" FET transistor is a FET transistor having a (strictly) positive threshold voltage, $V_{TH}$, that is in a range from (positive) 450 millivolts to (positive) 650 millivolts. As used in the present disclosure, an "intrinsic" FET transistor is a FET transistor having a negative or zero threshold voltage, $V_{TH}$, that is in a range from (negative) 150 millivolts to about zero volts. Accordingly, for a gate-to-source voltage of about zero volts, a regular N-type FET transistor operates well within its triode region of operation, and therefore is OFF (e.g., non-conduction, isolation). On the other hand, for a gate-to-source voltage of about zero volts, an intrinsic N-type FET transistor operates close to its saturation region of operation and may be considered in (partial) conduction, or partially ON, and therefore exhibit a relatively low $R_{ON}$.

With reference back to FIG. 2A, and in view of the above description with respect to regular and intrinsic transistors, in some preferred RF antenna switch designs, the switch element, SW, may exclusively contain intrinsic N-type FET transistors. In other words, the respective FET transistors, ($M_{T1}$, $M_{T2}$, . . . , $M_{Tn}$) and ($M_{S1}$, $M_{S2}$, . . . , $M_{Sp}$), of the stacks, TS and SS, are intrinsic N-type FET transistors that, as shown in FIG. 2B, can therefore be turned ON and OFF with a gate voltage (e.g., $V_{CTL\_TS}$ or $V_{CTL\_SS}$) that is respectively (substantially) greater than zero volts and (substantially) smaller than zero volts.

Figure 2B:
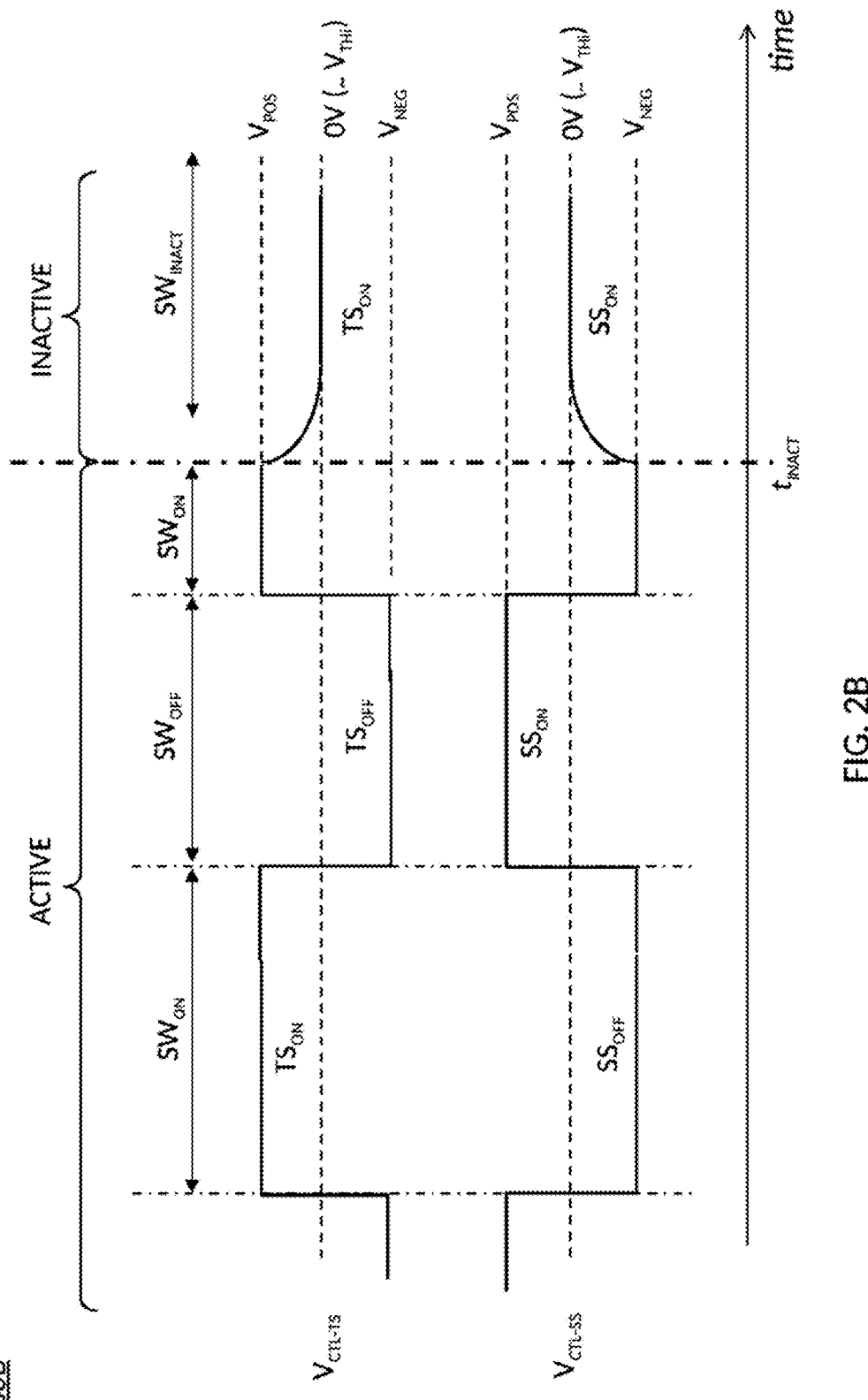
FIG. 2B shows a timing diagram representative of control signals and states of internal switches of the RF antenna switch of FIG. 2A during active and inactive modes of operation.

FIG. 2B shows a timing diagram (200B) representative of control signals (e.g., $V_{CTL\_TS}$ or $V_{CTL\_SS}$) and states (e.g., $SW_{ON}$, $SW_{OFF}$, $SW_{INACT}$) of internal switches (e.g., switch element SW) of the antenna switch of FIG. 2A during active and inactive modes of operation. As shown in FIG. 2B, during the active mode of operation, an ON state, $SW_{ON}$, of the switch element, SW, is provided by an ON state, $TS_{ON}$, of the through stack, TS, and an OFF state, $SS_{OFF}$, of the shunt stack, SS. On the other hand, during the active mode of operation, an OFF state, $SW_{OFF}$, of the switch element, SW, is provided by an OFF state, $TS_{OFF}$, of the through stack, TS, and an ON state, $SS_{ON}$, of the shunt stack, TS. As described above, during the active mode of operation, ON and OFF control of the stacks, TS and SS, is provided by corresponding high (e.g., $V_{POS}$) and low (e.g., $V_{NEG}$) voltage levels of the respective control signals, $V_{CTL\_TS}$ and $V_{CTL\_SS}$. Since such control signals are effectively applied to the respective gates of the intrinsic N-type FET transistors $(M_{T1}, M_{T2}, \ldots, M_{Tn})$ and $(M_{S1}, M_{S2}, \ldots, M_{Sp})$, then states, $TS_{ON}$ and $TS_{OFF}$, of the stack TS may respectively represent ON and OFF states of each transistor of the plurality of transistors $(M_{T1}, M_{T2}, \ldots, M_{Tn})$. Similarly, states, $SS_{ON}$ and $SS_{OFF}$, of the stack SS may respectively represent ON and OFF states of each transistor of the plurality of transistors $(M_{S1}, M_{S2}, \ldots, M_{Sp})$. It should be noted that in some implementations, each transistor of a same stack may receive a same control signal and therefore same voltage levels. However, in some implementations, and in order to further optimize ON/OFF properties of the transistors off a same stack, each transistor of the same stack may receive a different/respective control signal with appropriate/respective voltage levels. In both implementation, voltage levels to each transistor of a stack may be represented by the timing diagram (200B) of FIG. 2B.

With continued reference to FIG. 2B, the (stable) voltage level, $V_{POS}$, that is generated during the active mode of operation for use by the control signals (e.g., $V_{CTL\_TS}$ or $V_{CTL\_SS}$), may be in a range from about 1.5 volts to about 5 volts, such as, for example, in range from 3.2 volts to 4.2 volts. On the other hand, the (stable) voltage level $V_{NEG}$ that is generated during the active mode of operation for use by the control signals (e.g., $V_{CTL\_TS}$ or $V_{CTL\_SS}$), may be in a range from about −1.5 volts to about −5 volts, such as, for example, in range from −3.2 volts to −4.2 volts. In some applications, and as later described with reference to FIG. 5A, such voltage levels may be generated from an available low supply voltage (e.g., battery) via a combination of functional blocks (e.g., FIG. 5B later described) that may include charge pumps and voltage regulators.

During the inactive mode of operation (shown in FIG. 2B as occurring at a time $t_{INACT}$), the voltage levels, $V_{POS}$ and $V_{NEG}$, are not (actively) generated and therefore, as shown in FIG. 2B, (floating) nodes carrying such voltages discharge to eventually reach zero volts, with a discharge response based on respective combined capacitances presented by the gates of the intrinsic N-type FET transistors $(M_{T1}, M_{T2}, \ldots, M_{Tn})$ and $(M_{S1}, M_{S2}, \ldots, M_{Sp})$, and other leakage paths. Due to the intrinsic nature of such transistors (e.g., partially ON for gate-to-source voltage of zero volts), and as shown in FIG. 2B, the through stack, TS, and the shunt stack, SS, are (and remain) ON (e.g., partially ON) during the inactive mode of operation. In turn, such combination of $TS_{ON}$ and $SS_{ON}$ states that define the (steady-) state $SW_{INACT}$ of the switch element SW during the inactive mode of operation, may cause the stacks TS and SS to present an impedance mismatch that as described above may cause an elevated RSE that is beyond a desired minimum level.

Teachings according to the present disclosure overcome the above-described shortcoming of an RF antenna switch that exclusively uses intrinsic N-type FET transistors when operated an inactive mode of operation while maintaining benefits of using such intrinsic transistors. A first solution provided by the present teachings (e.g., FIG. 3A) to control/maintain a sufficiently low RSE, may include modifying the architecture of the switch element (e.g., switch element SWM comprising through stack TSM of FIG. 3A) such as to exhibit a different impedance during the inactive mode of operation where the control signal voltages reach zero volts. A second solution provided by the present teachings (e.g., FIG. 4A) to control/maintain a sufficiently low RSE, including low intermodulation products, may include addition of a termination stack (e.g., SW-TR of FIG. 4A) to the RF antenna switch that is activated during the inactive mode of operation to present a known termination impedance (e.g., 50 ohms at a frequency of operation) to the common port (e.g., AP of FIG. 4A) of the RF antenna switch. A third solution provided by the present teachings (e.g., FIGS. 5C-5F) to control/maintain a sufficiently low RSE, may include modifying of a bias signal generation circuit to actively drive voltages used by the control signals (e.g., $V_{CTL\_TS}$ or $V_{CTL\_SS}$) to (non-zero but lower magnitude) levels (e.g., $V_{POSM}$ or $V_{NEGM}$ of FIGS. 5C-5F) that when applied to the stacks (e.g., TS, SS) of the RF antenna switch shown in FIG. 2A, results in a combination of states of the stacks that are defined during the inactive mode of operation of the RF antenna switch, and therefore, by design, maintain the RSE within a desired minimum level.

First and second solutions according to the present teachings may include modification of the RF antenna switch per se, but not of the bias signal generation circuit (e.g., FIG. 5A) which during the inactive mode of operation may be completely deactivated for minimum current consumption. First and second solutions according to the present teachings are described below with reference to FIGS. 3A-4B.

On the other hand, the third solution according to the present teachings may not include modification of the RF antenna switch per se (e.g., FIGS. 3A/4A), rather of the bias signal generation circuit (e.g., FIGS. 5C-5F) to deactivate (e.g., respective inactive states) most of its functional blocks (e.g., charge pumps and voltage regulators, later described) besides, when applicable, of a block that converts a (positive) supply voltage (e.g., battery) to a negative supply voltage. Voltage levels generated by the positive and negative supply voltages may in turn be used to actively control/drive transistors of the stacks (e.g., TS, SS) to known/defined states during the inactive mode of operation of the RF antenna switch. It should be noted that such voltage levels generated by the positive and negative supply voltages may include different (e.g., lower) magnitude voltages than those used to control states of the RF antenna switch during the active mode of operation of the RF antenna switch. It should further be noted that since the voltage levels generated via the third solution may include magnitudes that are substantially greater than zero (e.g., substantially greater than |Vth| of regular and intrinsic transistors), such voltage levels may be used to control any type of transistor, including regular and/or intrinsic transistors to known/defined states during the inactive mode of operation of the RF antenna switch. In other words, the third solution may be considered compatible with any type of FET switch stack, whether including intrinsic N-type or P-type transistors, regular N-type or P-type transistors, or a combination thereof. The third solution according to the present teachings is described below with reference to FIGS. 5A-5G.

Figure 3A:
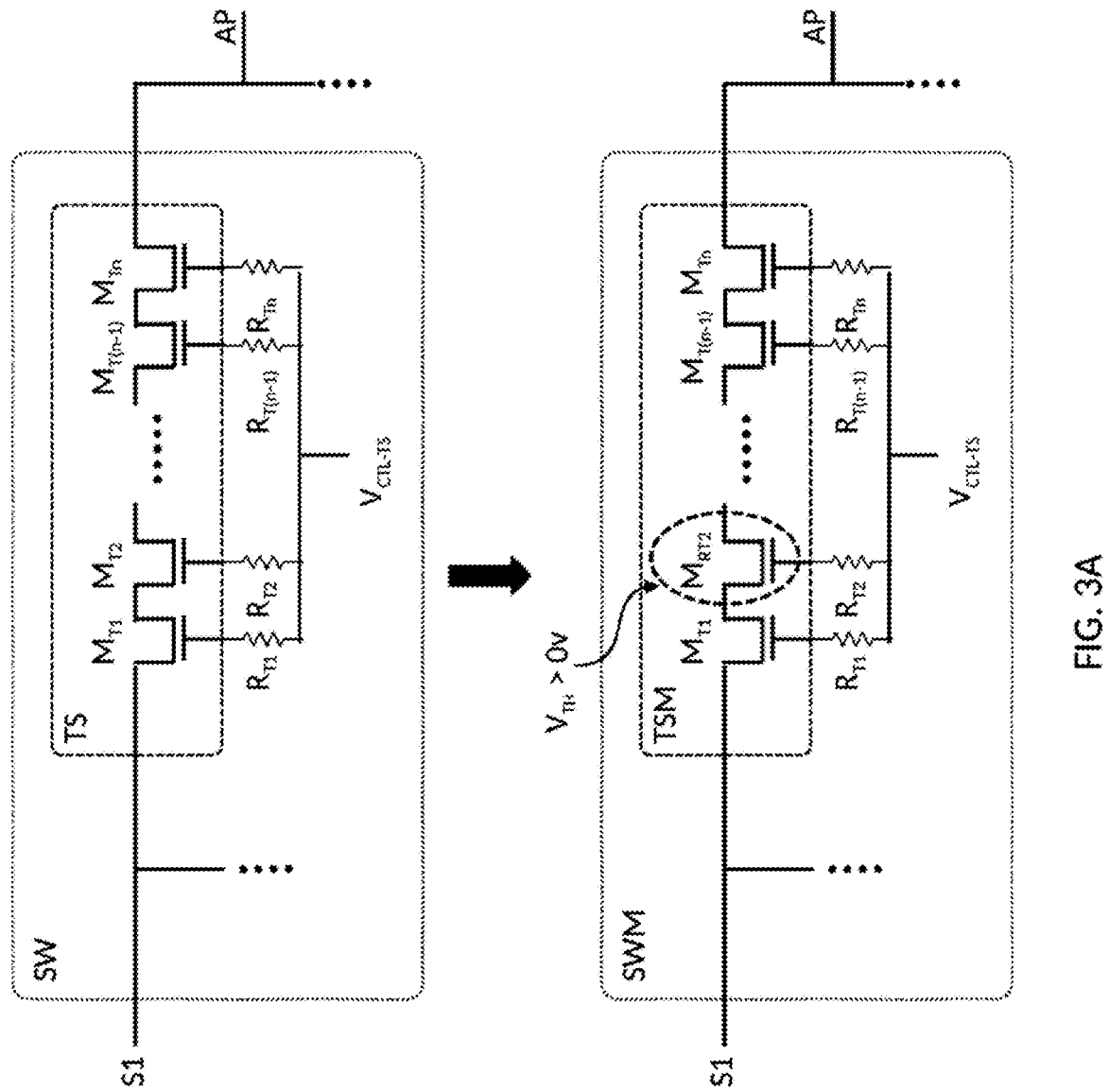
FIG. 3A shows details of a through stack of a switch element of an RF antenna switch according to an embodiment of the present disclosure.

Bottom of FIG. 3A shows details of a through stack, TSM, of a switch element, SWM, of an RF antenna switch according to an embodiment of the present disclosure that is contrasted to the switch element, SW, shown in the top of the FIG. 3A and previously described with reference to FIG. 2A. As shown in FIG. 3A, the through stack, TSM, may include a same number (e.g., n) of series connected N-type FET transistors $(M_{T1}, M_{RT2}, \ldots, M_{Tn})$ that may include at least one regular N-type FET transistor, $M_{RT2}$, in the sense of the present application, wherein remaining (e.g., n−1) transistors $(M_{T1}, M_{RT3}, \ldots, M_{Tn})$ may be intrinsic N-type FET transistors in the sense of the present application. In other words, as shown in FIG. 3A, the through stack, TSM, according to the present disclosure may be obtained from the through stack, TS, of FIG. 2A, by replacing at least one of the intrinsic transistors (e.g., $M_{T2}$) of TS with a regular transistor (e.g., $M_{RT2}$). Missing details of the switch element, SWM, of FIG. 3A, including details of a respective shunt stack (e.g., SS of FIG. 2A) can be found in FIG. 2A (e.g., shunt stack may remain unchanged). It should be noted that the at least one regular N-type FET transistor (e.g., $M_{RT2}$) of the through stack, TSM, may be arranged at any position within the stack, and that more than one such regular N-type FET transistor may be arranged within the through stack, TSM. Such number of regular N-type FET transistors could be designed based on power handling in inactive mode or a required/desired RSE performance. Furthermore, it should be noted that the switch element SWM shown in FIG. 3A must be used in all switch elements of a plurality of switch elements (e.g., $SW_1$, $SW_2$, . . . $SW_k$ shown in FIG. 2A) of an RF antenna switch. In other words, a single switch element SWM may not be sufficient to control RSE in the inactive mode of operation of an RF antenna switch that includes a plurality (e.g., k−1) switch elements SW according to FIG. 2A.

Figure 3B:
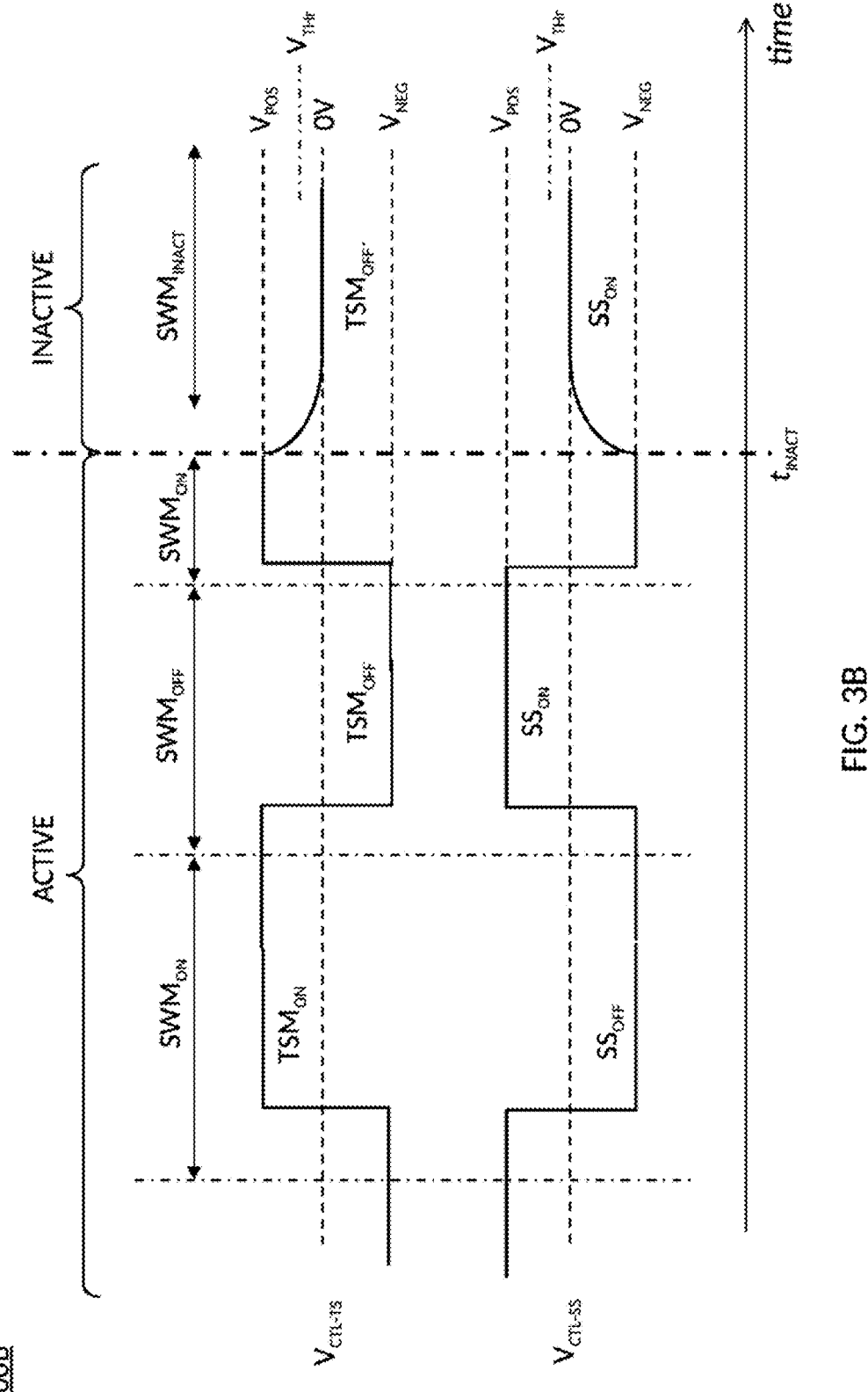
FIG. 3B shows a timing diagram representative of control signals and states of internal switches of an RF antenna switch that includes the through stack of FIG. 3A during active and inactive modes of operation.

FIG. 3B shows a timing diagram (300B) representative of control signals (e.g., $V_{CTL\_TS}$ or $V_{CTL\_SS}$) and states (e.g., $SWM_{ON}$, $SWM_{OFF}$, $SW_{INACT}$) of an internal switch (e.g., SWM of FIG. 3A) of an RF antenna switch that includes the through stack, TSM of FIG. 3A, during active and inactive modes of operation. In the timing diagram (300B) similar nomenclatures to ones used in the timing diagram (200B) of FIG. 2B are used, with the addition of a suffix "M" to indicate modified elements/states compared to elements/states described in FIG. 2B. Included in FIG. 3B as reference is a threshold voltage, $V_{THr}$, of the at least one regular N-type FET transistor, $M_{RT2}$, of the through stack, TSM of FIG. 3A. Because during the active mode of operation, the voltage levels, $V_{POS}$ and $V_{NEG}$, are sufficiently apart from (e.g., greater and smaller than) the threshold voltages of the plurality of the intrinsic (e.g., $V_{THi}$ of FIG. 2B) and regular (e.g., $V_{THr}$) N-type FET transistors of the stacks TSM and SS, then similarly to the states described in FIG. 2B, an ON state, $SWM_{ON}$, of the switch element, SWM, is provided by an ON state, $TSM_{ON}$, of the through stack, TSM, and an OFF state, $SS_{OFF}$, of the shunt stack, SS. On the other hand, during the active mode of operation, an OFF state, $SWM_{OFF}$, of the switch element, SWM, is provided by an OFF state, $TSM_{OFF}$, of the through stack, TSM, and an ON state, $SS_{ON}$, of the shunt stack, SS. In other words, during the active mode of operation, the switch element SWM may exhibit similar impedances to the switch element SW of FIG. 3A, and therefore similar (acceptable) RSE performance.

However, and as shown in FIG. 3B, during the inactive mode of operation, the state $SWM_{INACT}$ of the switch element SWM is defined by an OFF state, $TSM_{OFF*}$, of the through stack, TSM, and an ON state, $SS_{ON}$, of the shunt stack, SS. It should be noted that the state $SS_{ON}$ may be same (e.g., same impedance, conduction characteristics) as one described above with reference to FIGS. 2A/2B since such state is provided/defined by respective ON states of the same transistors (e.g., $M_{S1}$, $M_{S2}$, . . . , $M_{Sp}$) and therefore they present a same (low) impedance. On the other hand, the state $TSM_{OFF*}$ may be considered different from the state $TS_{OFF}$ state since the state $TSM_{OFF*}$ may be provided/defined by a respective OFF state of the at least one regular N-type FET transistor, $M_{RT2}$, in combination with the respective ON states of the remaining intrinsic N-type FET transistors $(M_{T1}, M_{T3}, \ldots, M_{Tn})$. When levels of the control voltages (e.g., $V_{POS}$, $V_{NEG}$) reach (settle to) zero volts during the inactive mode of operation, the at least one regular N-type FET transistor, $M_{RT2}$, of the through stack, TSM, turns OFF while the remaining (intrinsic) transistors of the through stack, TSM, turn ON. Because these transistors are in series connection, then the combined impedance of the through stack, TSM, during the inactive mode of operation may essentially be represented by the high impedance of the OFF state of the at least one regular N-type FET transistor, $M_{RT2}$. Size and characteristics of the at least one regular N-type FET transistor, $M_{RT2}$, of the through stack, TSM, may be designed in view of a desired combined high impedance of the through stack, TSM, during the OFF state, $TSM_{OFF*}$, that may be sufficiently high (e.g., at RF frequencies of operation) to limit the RSE in the inactive mode of operation.

Figure 4A:
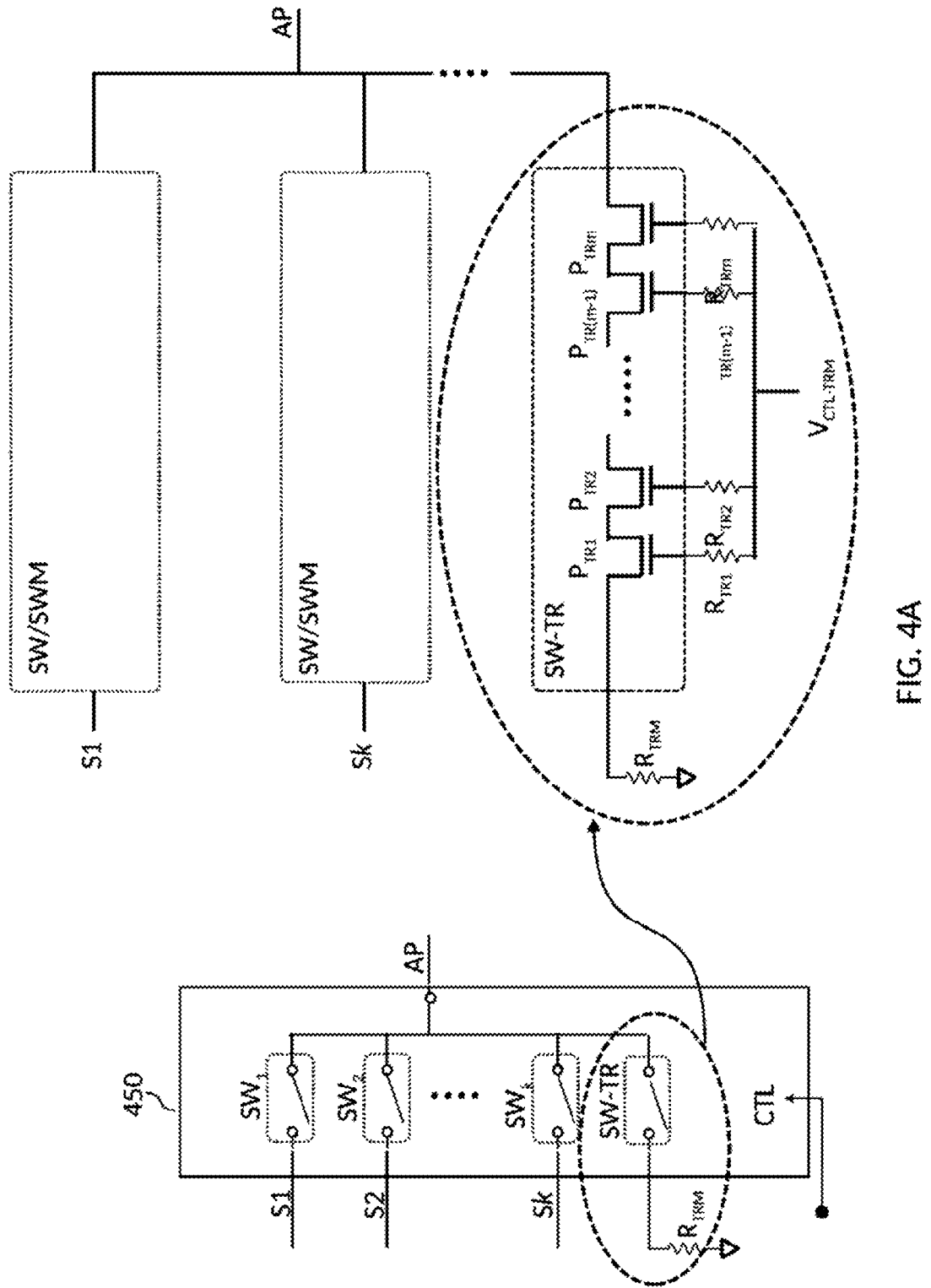
FIG. 4A shows details of a termination stack of an RF antenna switch according to an embodiment of the present disclosure.

FIG. 4A shows details of a termination stack (SW-TR, $R_{TRM}$) of an RF antenna switch (450) according to an embodiment of the present disclosure. As shown in the left side of FIG. 4A, the RF antenna switch (450) may be based on the RF antenna switch (150, 250) described above with reference to FIG. 2A modified via addition of the termination stack (SW-TR, $R_{TRM}$). As shown in FIG. 4A, the termination stack (SW-TR, $R_{TRM}$) may include a plurality (e.g., m) of series connected FET transistors $(P_{TR1}, P_{TR2}, \ldots, P_{TRm})$ whose gates are coupled to a (termination stack) control signal, $V_{CTL\_TRM}$, via a respective plurality of gate resistors $(R_{TR1}, R_{TR2}, \ldots, R_{TRm})$, each such gate resistor in series connection with a respective transistor gate.

The termination stack (SW-TR, $R_{TRM}$) of FIG. 4A may operate as a switch that under control of the control signal, $V_{CTL\_TRM}$, selectively couples the common port, AP, of the RF antenna switch to ground through an impedance (e.g., resistance, termination impedance/resistance), $R_{TRM}$. When the termination stack is ON (e.g., switched ON, ON state, active, activated), the common port, AP, sees an impedance that is a combination (e.g., sum) of the $R_{ON}$ of the transistors $(P_{TR1}, P_{TR2}, \ldots, P_{TRm})$ and the termination impedance, $R_{TRM}$. According to a nonlimiting embodiment of the present disclosure, such impedance seen by the common port, AP, when the termination stack is ON, may be designed to be a system impedance used in an RF communication system, such as, for example, 50 ohms. In this case, a value of the termination impedance, $R_{TRM}$, may be based on the $R_{ON}$ of the transistors $(P_{TR1}, P_{TR2}, \ldots, P_{TRm})$ so to provide, in combination, the system impedance. Accordingly, the termination impedance, $R_{TRM}$, may not be required (e.g., equal to zero ohms) if the transistors $(P_{TR1}, P_{TR2}, \ldots, P_{TRm})$ are designed to provide an $R_{ON}$ such as the product ($m \times R_{ON}$) is equal to the system impedance. On the other hand, when the termination stack is OFF, the common port, AP, sees a high impedance provided by respective OFF states of the transistors ($P_{TR1}$, $P_{TR2}$, . . . , $P_{TRm}$). It should be noted that in some embodiments, the number m of the transistors ($P_{TR1}$, $P_{TR2}$, . . . , $P_{TRm}$) may be equal to the number of transistors in the stacks TS, TSM, and SS described above with reference to FIG. 2A and FIG. 3A. It should be noted that in a case where a non-zero termination impedance, $R_{TRM}$, may be required, such impedance may be integrated on a same die (e.g., on-chip) as the termination stack/antenna switch or separate (e.g., off-chip).

According to an embodiment of the present disclosure, the termination stack (SW-TR, $R_{TRM}$) of FIG. 4A is OFF during the active mode of operation and ON during the inactive mode of operation of the RF antenna switch (450). Accordingly, during the active mode of operation, the termination stack (SW-TR, $R_{TRM}$) may be considered as isolated (e.g., in isolation, high impedance) with respect to the common port, AP, of the RF antenna switch (450), and during the inactive mode of operation, the termination stack (SW-TR, $R_{TRM}$) may be considered as terminating the common port, AP, of the RF antenna switch (450) with a system impedance. In turn, termination of the common port, AP, may limit the RSE in the inactive mode of operation, including RSE associated with emission of harmonics, intermodulation products and/or frequency conversion products.

It should be noted that use of the termination stack (SW-TR, $R_{TRM}$) of FIG. 4A as means to limit RSE in the inactive mode of operation of an RF antenna switch is compatible with use of a switch element (e.g., SWM of FIG. 3A) that includes at least one regular N-type FET transistor as described above with reference to FIGS. 3A/3B. In other words, all of the internal switches ($SW_1$, $SW_2$, . . . , $SW_k$) of the RF antenna switch (450) shown in FIG. 4A may include the switch element, SWM, described above with reference to FIG. 3A.

With continued reference to FIG. 4A, because (a low value of) an $R_{ON}$ of the transistors ($P_{TR1}$, $P_{TR2}$, . . . , $P_{TRm}$) may not be considered as critical, such transistors may be advantageously designed with a small size (e.g., width to length ratio) and as regular P-type FET transistors in the sense of the present application. Accordingly, for a gate-to-source voltage of zero volts (and smaller, negative), the P-type FET transistors ($P_{TR1}$, $P_{TR2}$, . . . , $P_{TRm}$) turn ON, and for a gate-to-source voltage that is one volt or greater, the P-type FET transistors ($P_{TR1}$, $P_{TR2}$, . . . , $P_{TRm}$) turn OFF.

Figure 4B:
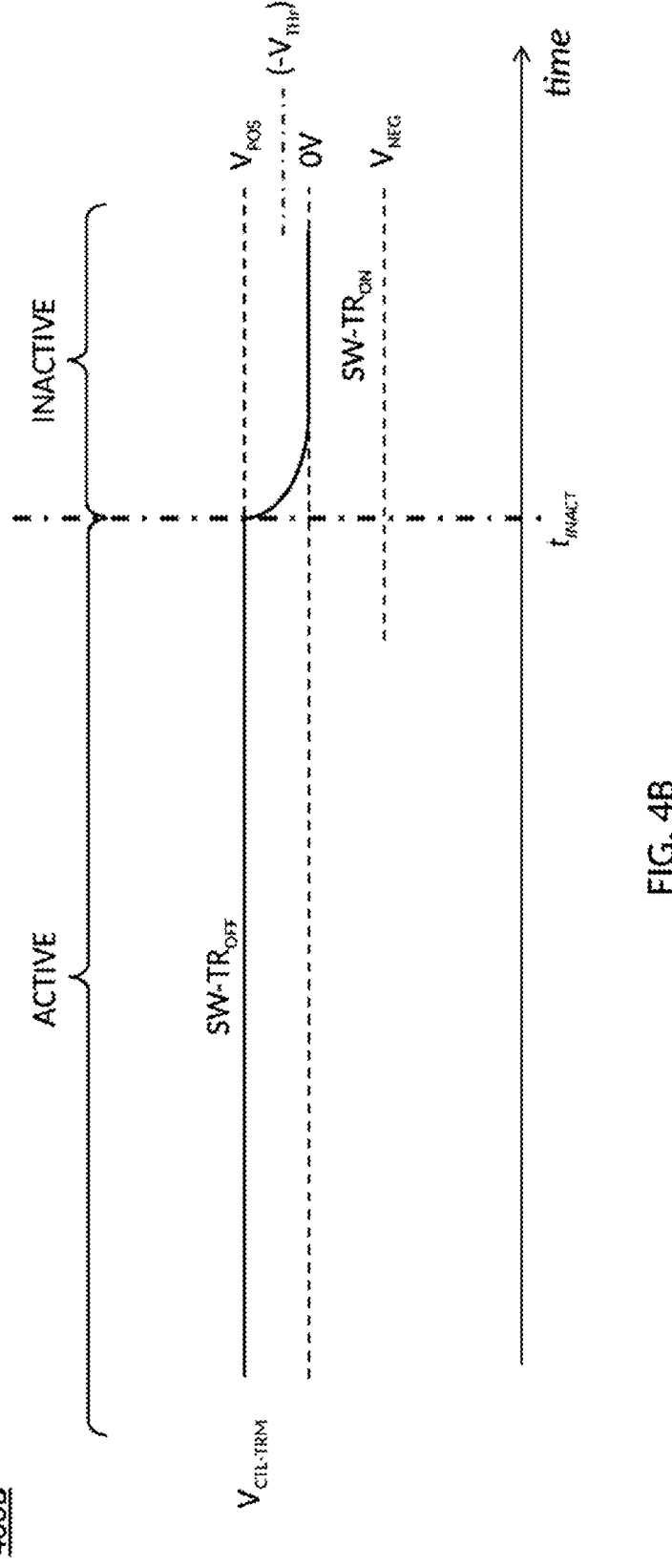
FIG. 4B shows a timing diagram representative of a control signal and states of the termination stack of FIG. 4A during active and inactive modes of operation.

It follows that according to an embodiment of the present disclosure, and as shown in the timing diagram (400B) of FIG. 4B, during the active mode of operation of the RF antenna switch (e.g., 450 of FIG. 4A), a voltage level of the control signal, $V_{CTL\_TRM}$, that controls a state of the termination stack (SW-TR, $R_{TRM}$) is positive and (substantially) greater (e.g., one volt or greater) than the threshold voltage (e.g., $-V_{THr}$ of FIG. 4B, about 0.5 volts) of the regular P-type transistors ($P_{TR1}$, $P_{TR2}$, . . . , $P_{TRm}$). Accordingly, as shown in FIG. 4B, during the active mode of operation of the RF antenna switch (e.g., 450 of FIG. 4A), a state of the termination stack (SW-TR, $R_{TRM}$) is OFF (e.g., SW-TR$_{OFF}$). On the other hand, during the inactive mode of operation of the RF antenna switch (e.g., 450 of FIG. 4A), a voltage level of the control signal, $V_{CTL\_TRM}$, that controls a state of the termination stack (SW-TR, $R_{TRM}$) is zero volts, and therefore (substantially) smaller than the threshold voltage (e.g., $-V_{THr}$ of FIG. 4B, about 0.5 volts) of the regular P-type transistors ($P_{TR1}$, $P_{TR2}$, . . . , $P_{TRm}$). Accordingly, as shown in FIG. 4B, during the inactive mode of operation of the RF antenna switch (e.g., 450 of FIG. 4A), a state of the termination stack (SW-TR, $R_{TRM}$) is ON (e.g., SW-TR$_{ON}$). It should be noted that as shown in FIG. 4B, the voltage level of control signal, $V_{CTL\_TRM}$, is provided by the voltage $V_{POS}$ that is actively generated by a bias signal generator such as one shown in FIG. 5A later described. As previously described in the present disclosure, during the inactive mode of operation of such bias signal generator circuit, the voltage $V_{POS}$ may naturally settle to zero volts, and therefore no extra control and/or switching may be required for generation of the control signal, $V_{CTL\_TRM}$, besides switching of modes of operation of the bias signal generator circuit as later described. It should be noted that for a case of the P-type transistors described herein, the control voltage applied to the gates of such transistors may effectively represent a source-to-gate voltage (and not a gate-to-source voltage), which therefore turns the P-type transistors ON when having a magnitude that is greater than a magnitude of the threshold voltage (e.g., $|V_{THr}|$).

Figure 5A:
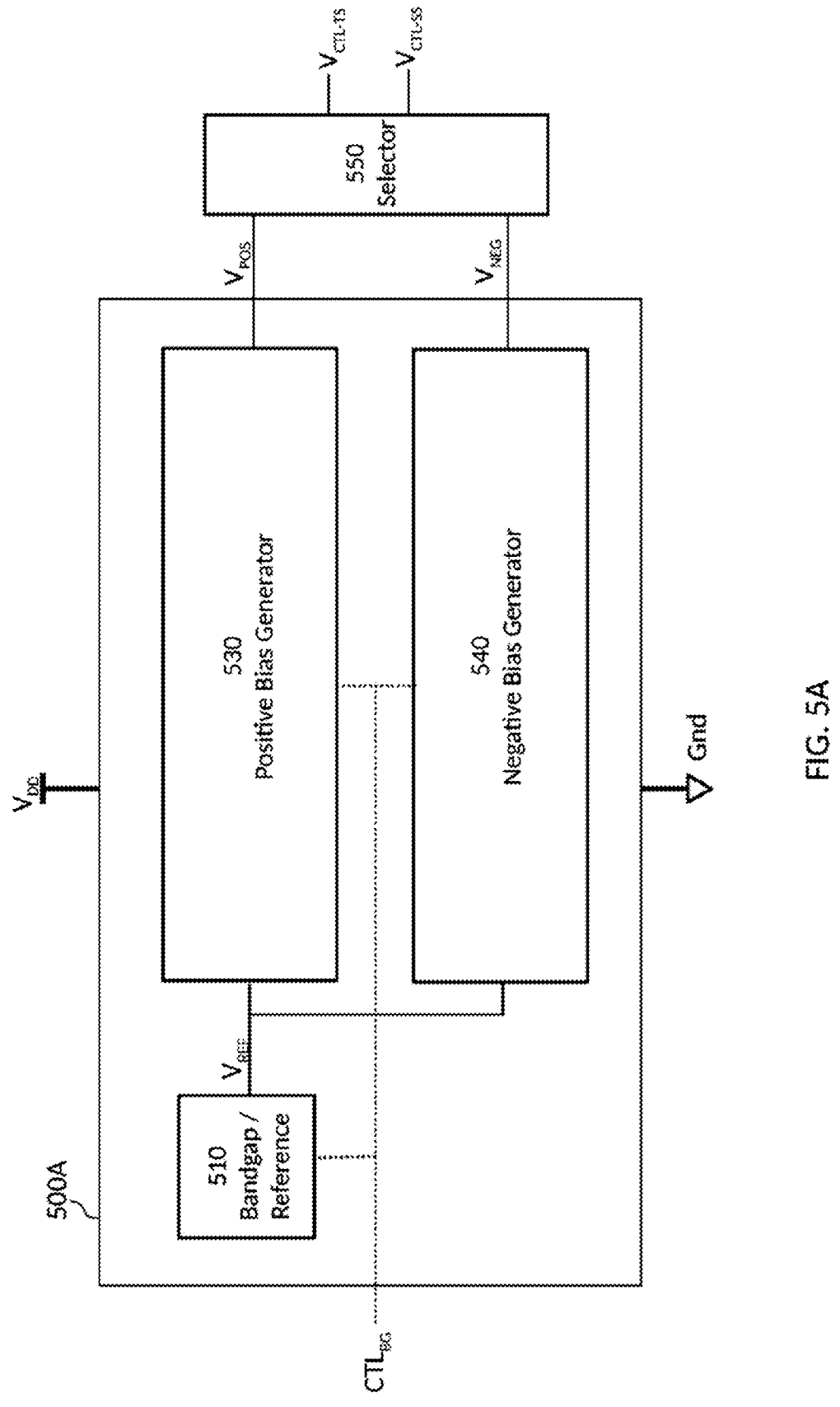
FIG. 5A shows a block diagram of a bias signal generator circuit.

FIG. 5A shows a (simplified) block diagram of a bias signal generator circuit (500A) that may be configured to generate (stable) bias voltages (e.g., $V_{POS}$, $V_{NEG}$) at levels suitable to drive (e.g., control state) of the internal switch elements of an RF antenna switch, including an RF antenna switch according to the present teachings. As shown in FIG. 5A, the bias signal generator circuit (500A) may include main functional blocks (510, 530, 540) operable from a single supply voltage, $V_{DD}$. In a case of a handheld device, the single supply voltage, $V_{DD}$, may be a battery or a reduced regulated voltage from a battery. Other implementations may include two separate supply voltages (e.g., a negative and a positive supply voltage), but similar main functional blocks (e.g., 510, 530, 540).

In some implementations, the main functional blocks (e.g., 510, 530, 540) may include a block (510) that is configured to generate a stable reference (e.g., bandgap, reference) voltage, $V_{REF}$, from the (e.g., slowly varying) supply voltage, $V_{DD}$. In turn, the positive bias generator block (530) and the negative bias generator block (540) may respectively generate the positive (e.g., $V_{POS}$) and the negative (e.g., $V_{NEG}$) bias voltages based on the voltages $V_{REF}$ and $V_{DD}$ (as referenced to a ground, Gnd).

Figure 5B:
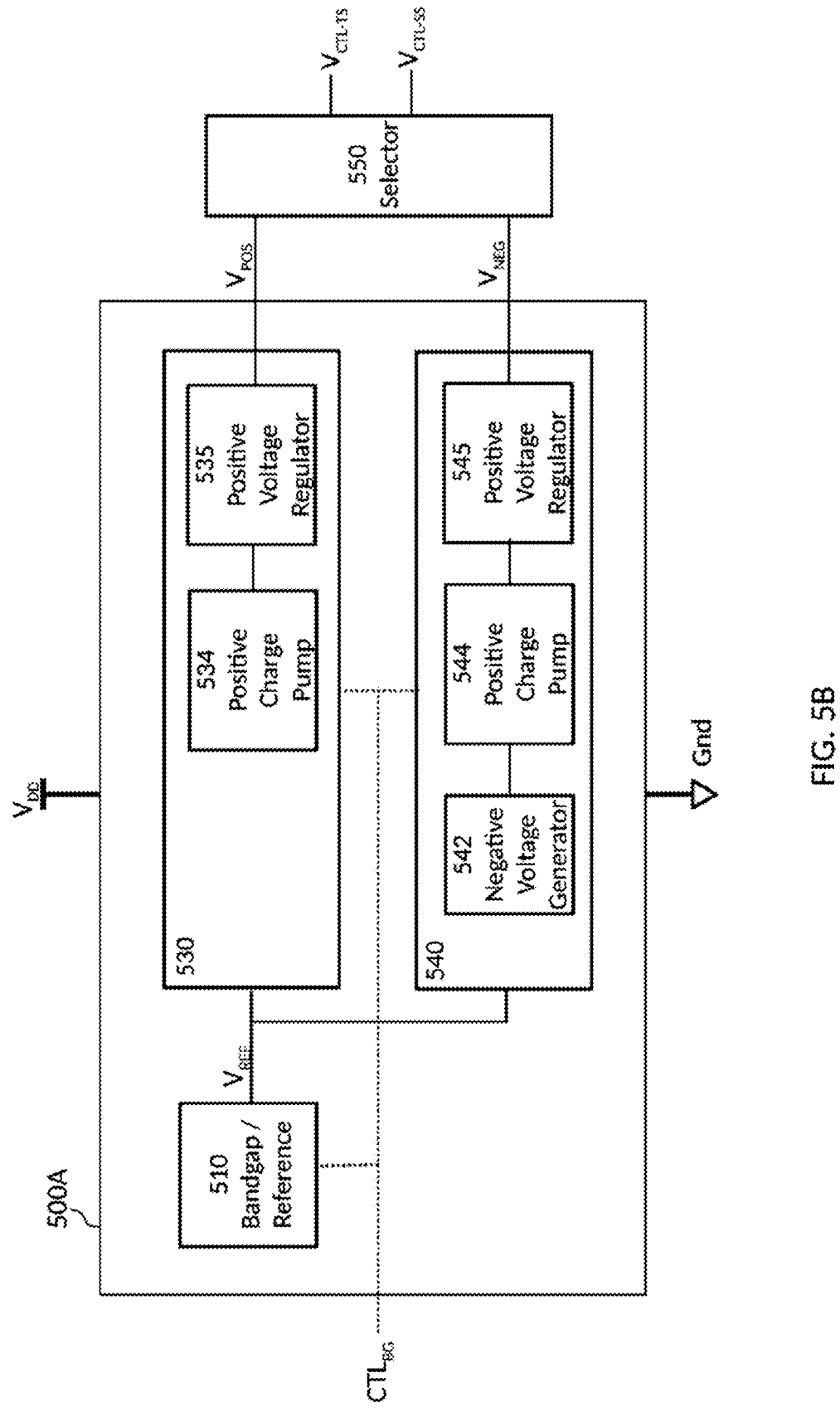
FIG. 5B shows further details of the block diagram of FIG. 5A.

FIG. 5B shows further details of the block diagram of the bias signal generator (500A). In particular, shown in FIG. 5B are details of specific functional blocks that may respectively be included in the main functional blocks (530) and (540). These include blocks (534, 535) that may be included in the main functional block (530) and blocks (544, 545) that may be included in the main functional block (540). Furthermore, as shown in FIG. 5B, in some implementations of the biasing signal generator (500A), a block (542) may be further (optionally) included within the block (540). The block (542) may be a negative voltage generator block that is configured to convert the positive supply voltage, $V_{DD}$, to a negative supply voltage ($-V_{DD}$, e.g., inverted version of $V_{DD}$) of substantially equal magnitude. It should be noted that in some implementations, the negative voltage generator block (542) may be an external block to the bias signal generator (500A), or in other words, not included in the block diagram of the bias signal generator (500A) shown in FIG. 5B. It should further be noted that in some implementations, the shown functional blocks (e.g., 534, 535, 542, 544, 545) may be arranged in a different order/sequence.

With continued reference to FIG. 5B, the positive and negative charge pump blocks (534) and (544) may respectively charge pump (e.g., by a factor of about 3× to 5×, such as for example, 4×) the positive supply voltage, $V_{DD}$, and the negative supply voltage ($-V_{DD}$) generated by the block (542), which are in turn fed to respective positive and negative voltage regulator blocks (535) and (545) for regulation with the help of the stable reference voltage, $V_{REF}$. Accordingly, as shown in FIG. 5B, output of the positive and negative voltage regulator blocks (535) and (545) respectively provide the positive and negative bias voltages, $V_{POS}$ and $V_{NEG}$. Furthermore, as shown in FIG. 5A/5B, the positive and negative bias voltages, $V_{POS}$ and $V_{NEG}$, may be provided to a selector circuit (e.g., switch, level shifter) that generates control signals (e.g., $V_{CTL\_TS}$, $V_{CTL\_SS}$) described above with reference to, for example, FIG. 2B and FIG. 3B.

With continued reference to FIG. 5A/5B, operation of the bias generator circuit (500A) according to an active mode of operation or an inactive (low power) mode of operation may be based on a control signal, $CTL_{BG}$. In some example implementations, and as shown in FIGS. 5A/5B, such control signal may be routed to each of the main functional blocks (e.g., 510, 530540) and respective specific functional blocks (e.g., 534, 535, 542, 544, 545) for control of the mode of operation of each such block. Such control may be all encompassing and not specific to each block or can be specific to each block (e.g., each block including a separate control line and/or command) for independent mode control of each block. It should be noted that in FIGS. 5A/5B, the supply rails (e.g., $V_{DD}$, Gnd) are shown in thick lines, the control lines (e.g., $CTL_{BG}$) are shown in dotted lines, and outputs from the functional blocks are shown in normal lines.

It should further be noted that although the functional blocks (e.g., 510, 530, 540) of FIG. 5A are shown as part of one circuit/block (500A) and the selector circuit (550) is shown outside the block/circuit (500A), partitioning of functionalities provided by the circuits (500A) and (550) may be considered as arbitrary as any other partitioning of such functionalities for integration in different or same blocks/modules may be envisioned. In particular, in some embodiments, any one or more of the functionalities provided by the circuits (500A) and (550) may be included in any one of the RF antenna switches described in the present disclosure. In other words, in some embodiments, the circuits (500A) and (550) may be monolithically integrated with any one of the RF antenna switches (150), (250) or (450) described above in the present disclosure. Furthermore, in some embodiments, one or more of the main blocks (510), (530) or (540), or of the specific blocks (534), (535), (542), (544) or (545), may be separated from the circuit block (500A) or duplicated outside of the circuit block (500A) in order to facilitate component placement and/or improve performance of a corresponding/target system or integrated chip (IC).

During the active mode of operation of the bias generator circuit (500A) of FIGS. 5A/5B, all the main functional blocks (510, 530, 540), including the specific blocks (534, 535, 542, 544, 545), may be active to (actively) generate the positive and negative bias voltages, $V_{POS}$ and $V_{NEG}$. For example, during the active mode of operation, a current may flow from the positive supply voltage, $V_{DD}$, through each of said blocks On the other hand, in order to save power (especially with respect to operation of the charge pumps 534 and 544 which may consume considerable current), during the inactive mode of operation, all of the main functional blocks (510, 530, 540), including the specific blocks (534, 535, 542, 544, 545), may be inactive such as essentially no current is consumed by such blocks. For example, during the inactive mode of operation, no current may flow from the positive supply voltage, $V_{DD}$, through said blocks. Accordingly, during the inactive mode of operation of the bias generator circuit (500A), the voltages $V_{POS}$ and $V_{NEG}$, may (eventually) settle to zero volts, in turn engendering behavior/states of switch elements of an RF antenna switch described above with reference to, for example, FIG. 2B, FIG. 3B, and FIG. 4B. It should be noted that according to a nonlimiting embodiment, control of a current flow through the functional blocks for respective activation and deactivation may be based on an ON/OFF state of a respective switch that may enable/disable a conduction path for said current flow.

Figure 5C:
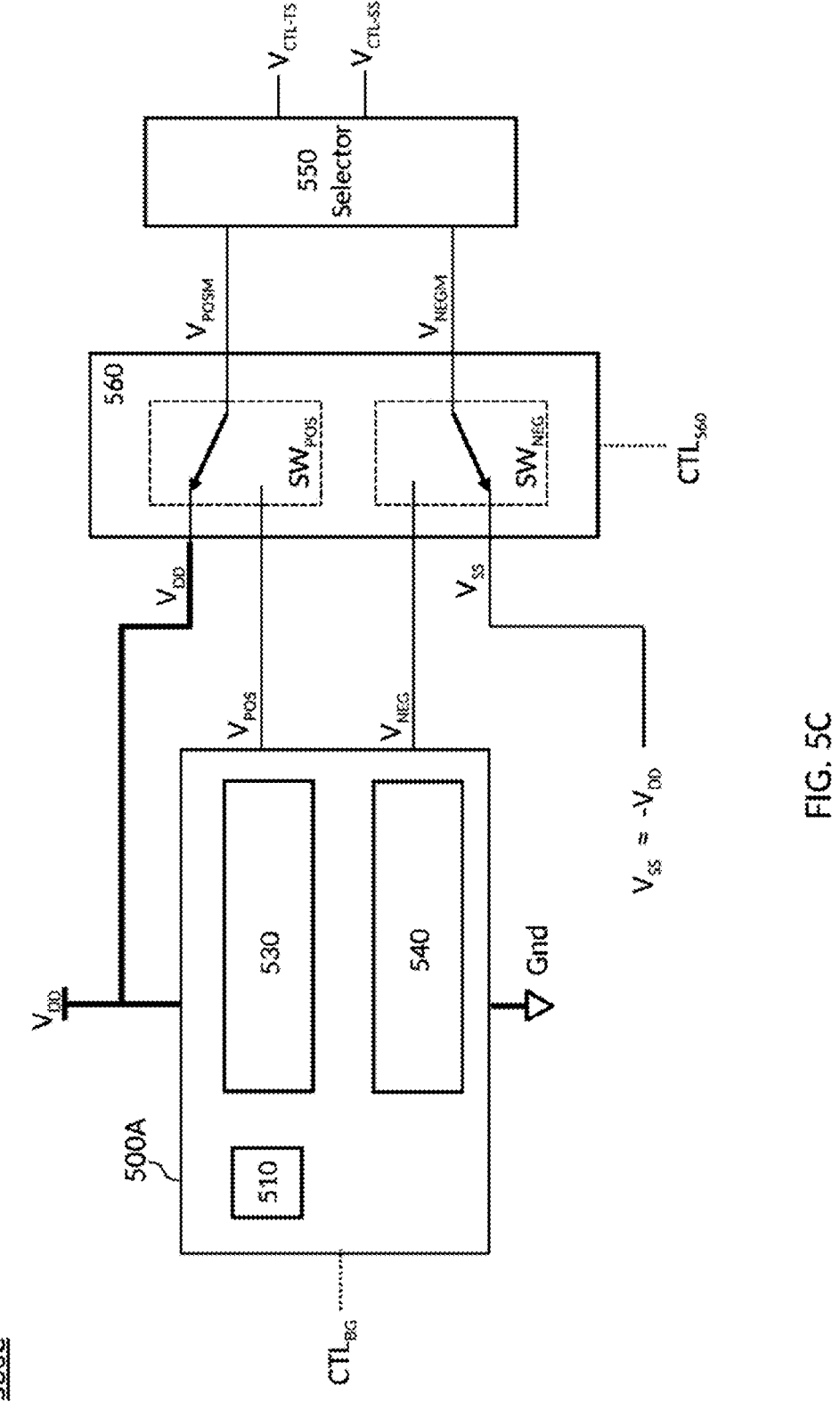
FIG. 5C shows a block diagram of a bias signal generator circuit according to an embodiment of the present disclosure.

FIG. 5C shows a (simplified) block diagram of a bias signal generator circuit (500C) according to an embodiment of the present disclosure. A person skilled in the art will realize that the block diagram of FIG. 5C may be based on the block diagram of FIG. 5A, including the bias signal generator (500A), with the addition of a selector switch (560) that may include positive and negative bias signal switch circuits (blocks), $SW_{POS}$ and $SW_{NEG}$. Under control of a control signal, $CTL_{560}$, the selector switch (560) may output respective positive and negative bias voltages, $V_{POSM}$ and $V_{NEGM}$, for operation in the active or inactive modes of operation. In particular, during the active mode of operation, the selector switch (560) may output the voltages $V_{POS}$ and $V_{NEG}$ actively generated by the block (500A) and respectively coupled to respective first throws of the switches $SW_{POS}$ and $SW_{NEG}$, and during the inactive mode of operation, the selector switch (560) may output the positive (supply) voltage, $V_{DD}$, and a negative voltage, $V_{SS}$, respectively coupled to respective second throws of the switches $SW_{POS}$ and $SW_{NEG}$. The control signal, $CTL_{560}$, may be provided to the selector switch (560) to control states of the positive and negative bias signal switch circuits, $SW_{POS}$ and $SW_{NEG}$. It should be noted that the control signal, $CTL_{560}$, may be part of, or separate from, the control signal, $CTL_{BG}$, used to control states of the block (500A). As shown in FIG. 5C, the respective outputs $V_{POSM}$ and $V_{NEGM}$, of the switches, $SW_{POS}$ and $SW_{NEG}$, may feed to a selector circuit similar to the selector circuit (550) described above with reference to FIGS. 5A/5B.

With continued reference to FIG. 5C, according to an embodiment of the present disclosure, the negative voltage, $V_{SS}$, may include a magnitude that is about equal to the magnitude of the positive supply voltage, $V_{DD}$. In other words, the negative voltage, $V_{SS}$, may be such that $V_{SS} \approx -V_{DD}$. Teachings according to the present disclosure may actively generate the negative voltage, $V_{SS}$, while minimizing power consumption of the bias signal generator (500C) during the inactive mode of operation. According to one embodiment of the present disclosure, generation of the negative voltage, $V_{SS}$, may include complete deactivation of the bias signal generator (500A) as described above with reference to FIGS. 5A/5B and generation of the negative voltage, $V_{SS}$, by way of a circuit (e.g., 580 of FIG. 5D) that may be external and separate from the bias signal generator (500A). According to another embodiment of the present disclosure, generation of the negative voltage, $V_{SS}$, may include partial deactivation of the bias signal generator (500A) as described above with reference to FIGS. 5A/5B and generation of the negative voltage, $V_{SS}$, by way of a functional block (e.g., 542 of FIG. 5B) that may be internal to the bias signal generator (500A). In other words, teaching according to the present disclosure may provide flexibility of implementation that may be based on design/implementation constraints of a target system. For example, if the target system includes a bias signal generator (e.g., 500A) that may not be amenable to modifications for provision of a negative voltage (e.g., $V_{SS}$) during the inactive mode of operation (i.e., while providing reduced power consumption), then a solution provided by the present teachings may be represented in FIG. 5D. On the other hand, if the target system includes a bias signal generator (e.g., 500A) that may be amenable to modifications for provision of the negative voltage (e.g., $V_{SS}$) during the inactive mode of operation (i.e., while providing reduced power consumption), then a solution provided by the present teachings may be represented in FIGS. 5E/5F.

Figure 5D:
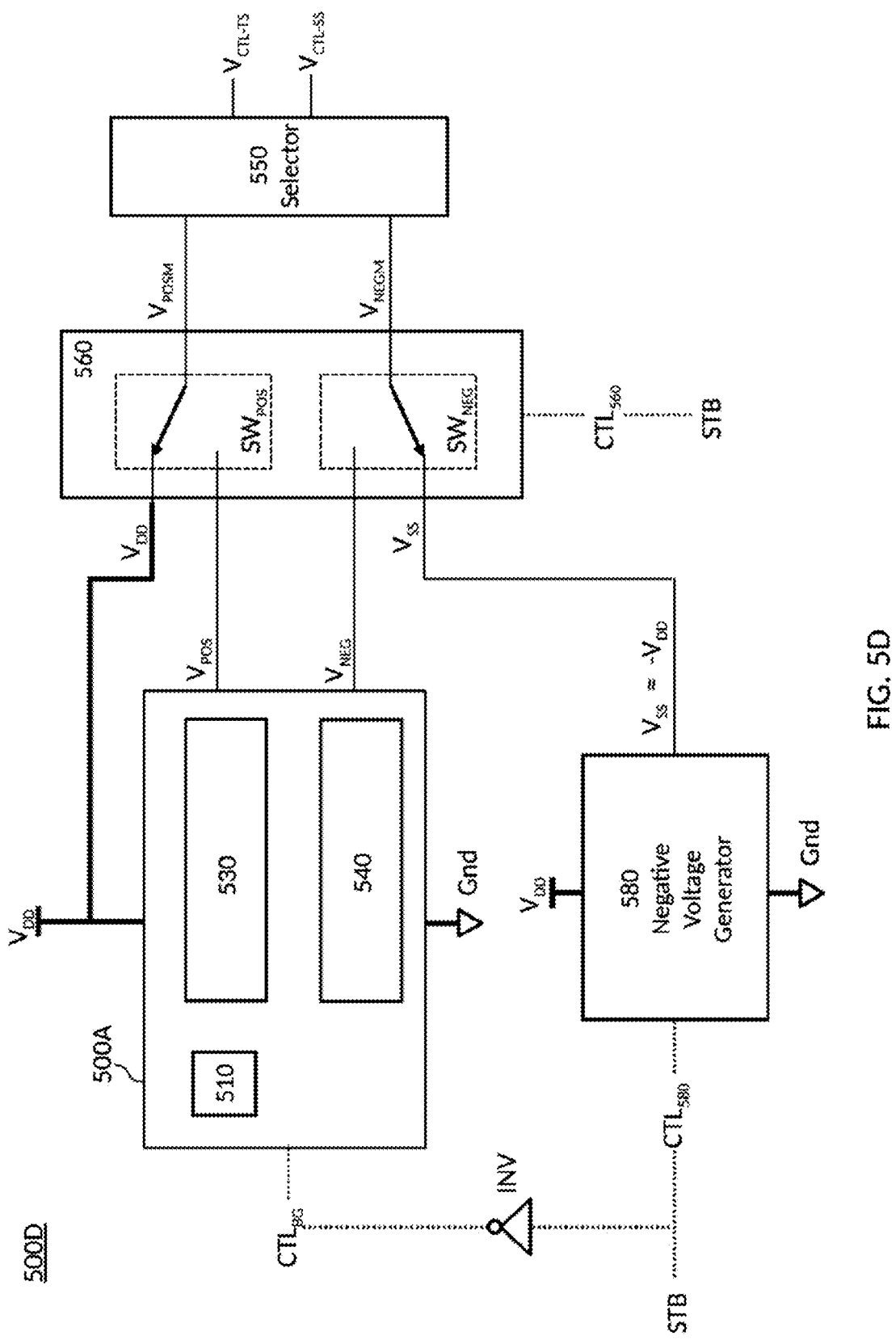
FIG. 5D shows a block diagram of a bias signal generator circuit according to another embodiment of the present disclosure.

FIG. 5D shows a block diagram of a bias signal generator circuit (500D) according to an embodiment of the present disclosure wherein the negative voltage, $V_{SS}$, may be generated by way of a circuit (580) that may be external and separate from the bias signal generator (500A). As shown in FIG. 5D, the circuit (580) may be a negative voltage generator that is configured to convert the positive supply voltage, $V_{DD}$, to a negative supply voltage $V_{SS} \approx -V_{DD}$ (e.g., inverted version of $V_{DD}$) of substantially equal magnitude. A control signal, $CTL_{580}$, may be provided to the circuit (580) to activate the circuit (580) during the inactive mode of operation of the bias signal generator (500A).

In some embodiments, the circuit (580) of FIG. 5D may not be needed during the active mode of operation of the bias signal generator (500A), and therefore the control signal, $CTL_{580}$, may deactivate (e.g., reduced power consumption) the circuit (580) during such active mode of operation. This may include cases where the bias signal generator (500A) may include the block (542) described above with reference to FIG. 5B used to generate an internal negative supply voltage for generation of the negative bias voltage, $V_{NEG}$.

In some embodiments, the circuit (580) of FIG. 5D may be needed during the active mode of operation of the bias signal generator (500A), and therefore the control signal, $CTL_{580}$, may not deactivate the circuit (580) during such active mode of operation. This may include cases where the bias signal generator (500A) may not include the block (542) described above with reference to FIG. 5B and therefore may use the externally generated negative (supply) voltage, $V_{SS}$, for generation of the negative bias voltage, $V_{NEG}$.

As shown in FIG. 5D, in some embodiments, control of the bias signal generator (500A) and the circuit (580) for respective activation and deactivation may be provided via a single control signal, STB. In this case, as shown in FIG. 5D, an inverter, such as a logic inverter, INV, may be used to invert the polarity/state of the control signal, STB, so that the block (500A) and (580) operate at opposite modes of operation (activated or deactivated). As shown in FIG. 5D, the control signal, STB, (or the inverted version) may also be used to control states of the switches, $SW_{POS}$ and $SW_{NEG}$, of the selector switch (560).

Figure 5E:
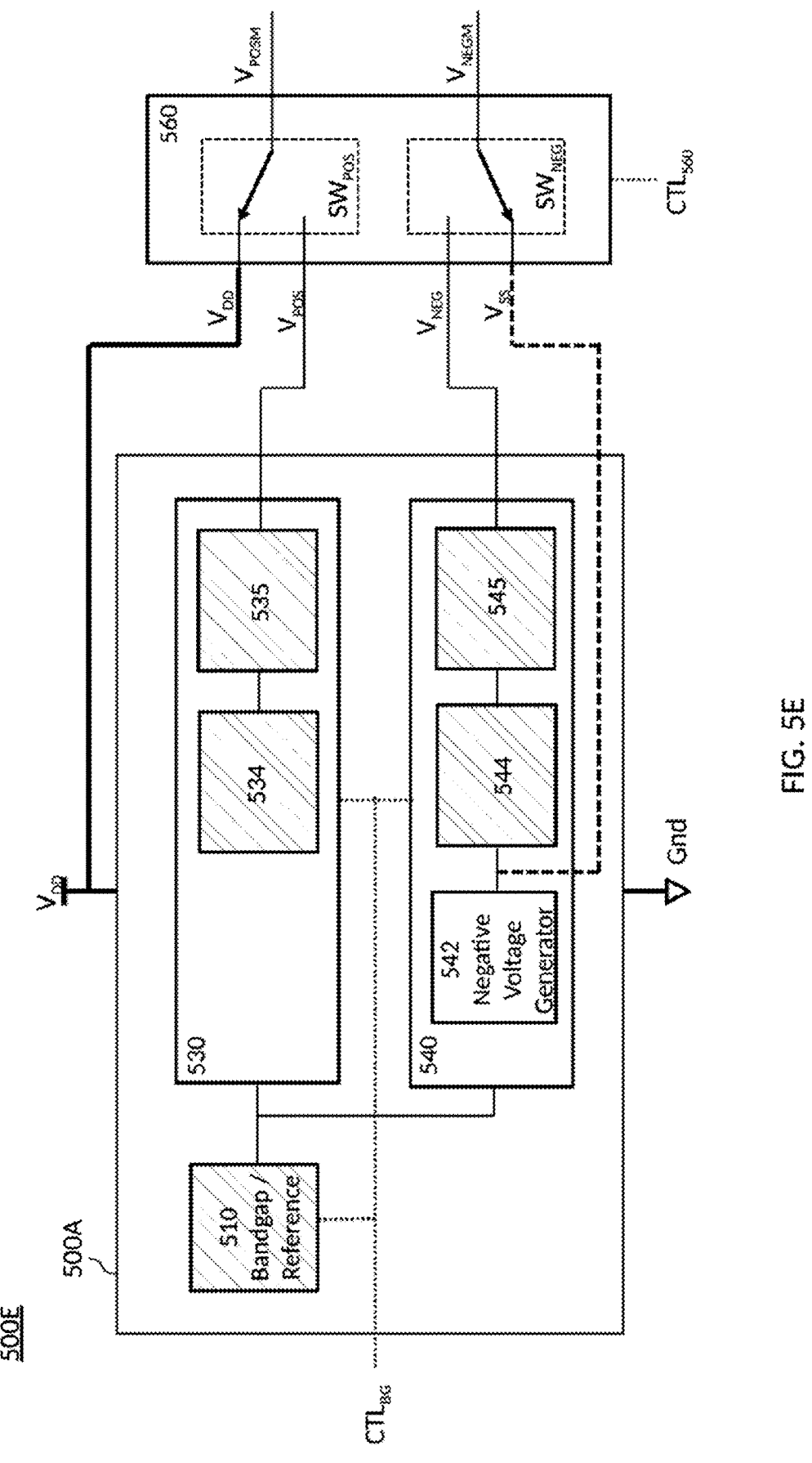
FIG. 5E shows a block diagram of a bias signal generator circuit according to yet another embodiment of the present disclosure.

FIG. 5E shows a block diagram of a bias signal generator circuit (500E) according to an embodiment of the present disclosure wherein the negative voltage, $V_{SS}$, may be generated by way of the negative voltage generator block (542) that as described above with reference to FIG. 5B may be internal to the bias signal generator (500A). During the active mode of operation of the bias signal generator circuit (500E), all the functional blocks (e.g., 510, 534, 535, 542, 544, 545) of the bias signal generator (500A) may be active to (actively) generate the positive and negative bias voltages, $V_{POS}$ and $V_{NEG}$, and respective states of the positive and negative bias signal switch circuits (blocks), $SW_{POS}$ and $SW_{NEG}$, may be configured to respectively output the positive and negative bias voltages, $V_{POS}$ and $V_{NEG}$. In other words, operation (and output) of the bias signal generator circuit (500E) during the active mode is similar to operation (and output) of the circuit (500A) of FIG. 5A during the active mode.

On the other hand, in order to save power (especially with respect to operation of the charge pumps 534 and 544 which may consume considerable current) while preventing levels of the bias voltages to drop to zero volts, during the inactive mode of operation, the functional blocks (510, 534, 535, 544, 545, shown in shadowed blocks in FIG. 5E) of the bias signal generator (500A) may be inactive such as essentially no current is consumed by such blocks, while the functional block (542, shown in bright block in FIG. 5E) may be active, so to actively (generate) the negative supply voltage, $V_{SS}$ (e.g., $V_{SS} \approx -V_{DD}$). Furthermore, and as shown in FIG. 5E, during the inactive mode of operation, respective states of the positive and negative bias signal switch circuits, $SW_{POS}$ and $SW_{NEG}$, may be configured to respectively output the positive and negative supply voltages, $V_{DD}$ and $V_{SS}$).

Figure 5F:
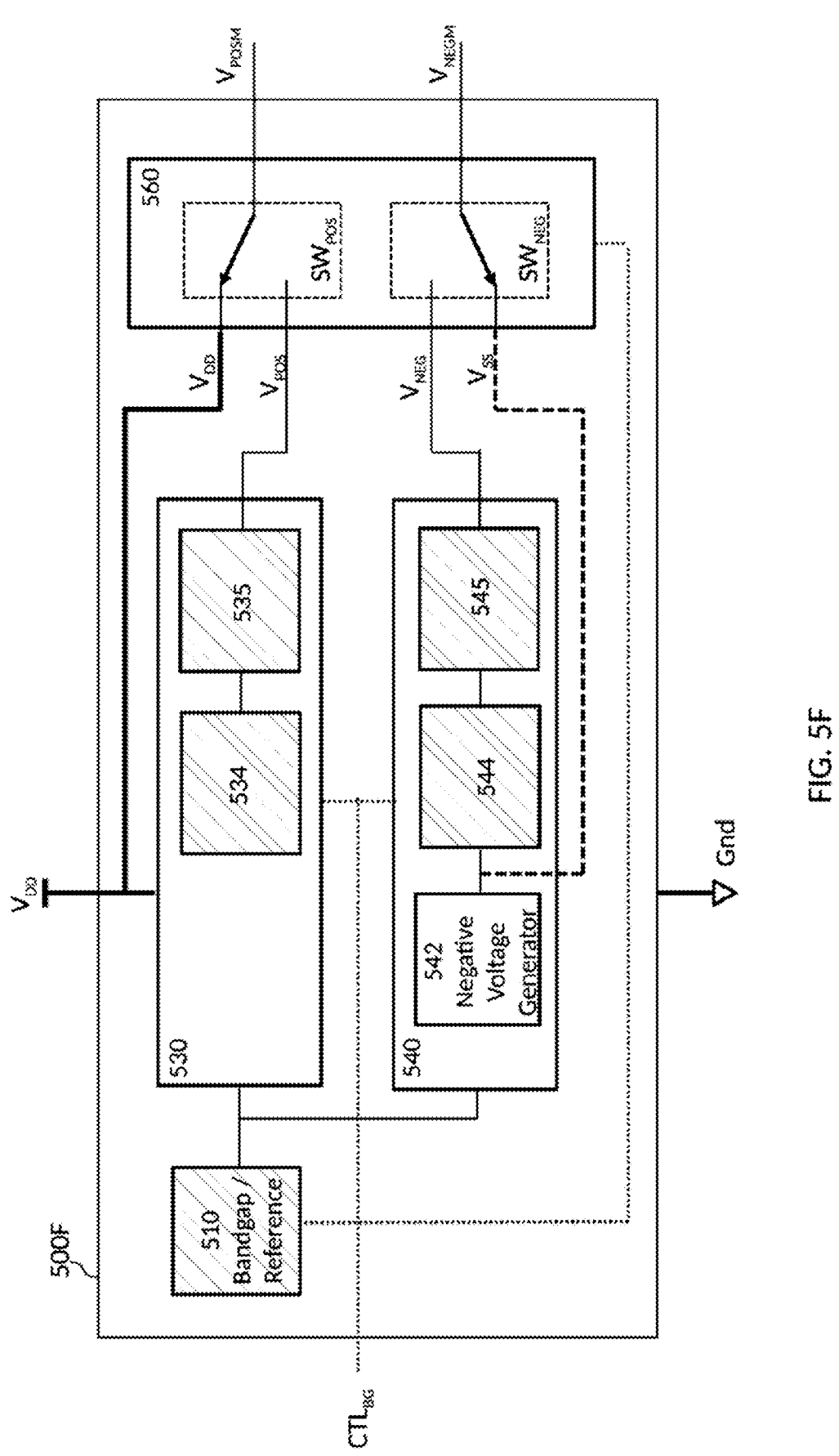
FIG. 5F shows an alternative implementation of the bias signal generator circuit of FIG. 5E.

FIG. 5F shows an alternative implementation of the bias signal generator circuit of FIG. 5E wherein the bias signal generator (e.g., 500A of FIG. 5E) and the selector switch (560) are part of a same block (500F, e.g., IC, module). As previously described in the present disclosure, partitioning of the functionalities provided by the described circuits/ block may be considered arbitrary. However, some limitations/constraints with respect to such partitioning flexibility (in principle) may exist in view of target systems being considered. Teachings according to the present disclosure may address such limitations/constraints.

Figure 5G:
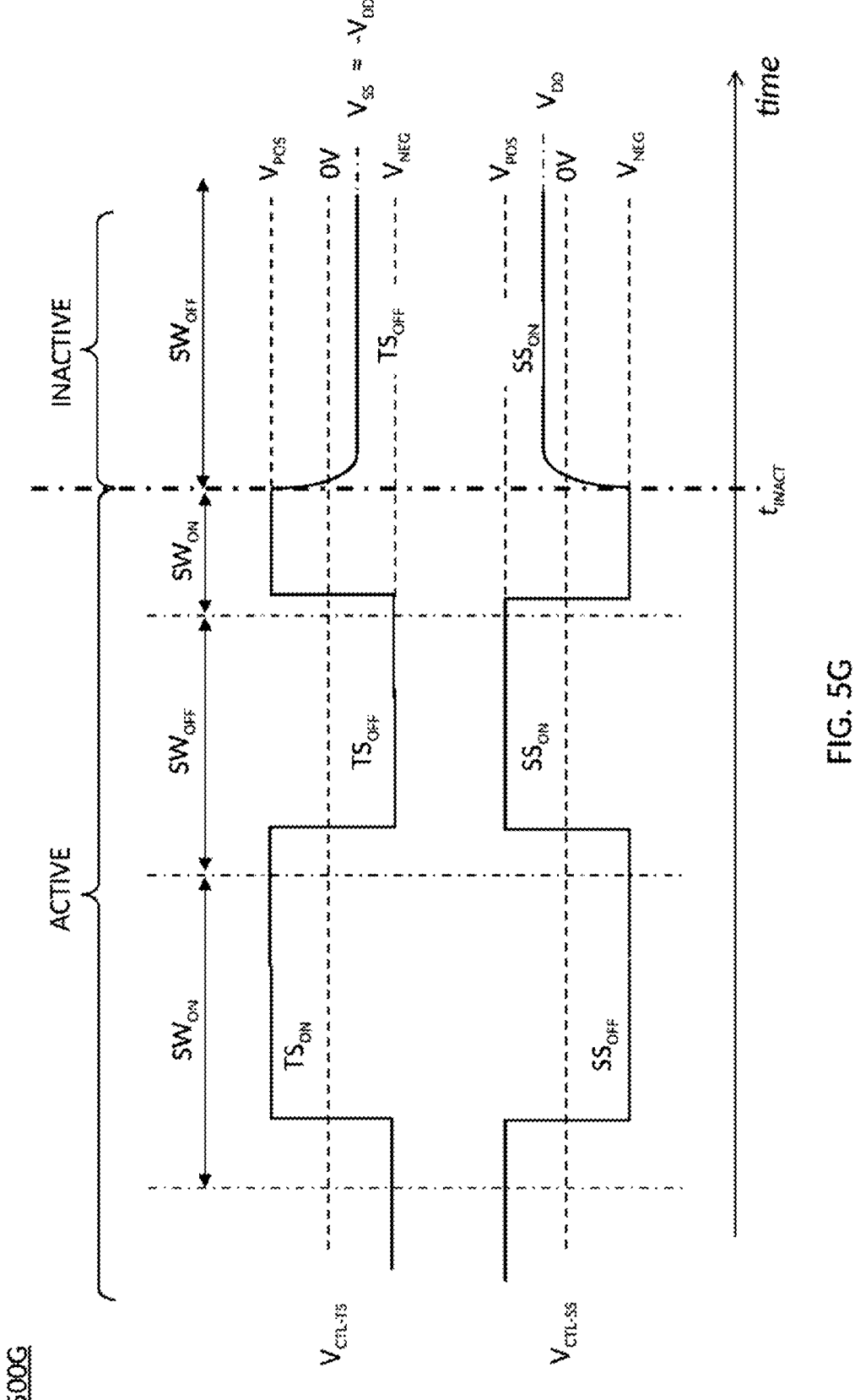
FIG. 5G shows a timing diagram representative of control signals and states of internal switches of the antenna switch of FIG. 2A during active and inactive modes of operation based on biasing signals provided by the bias signal generator according to the present disclosure.

In contrast to the bias signal generator (500A) of FIG. 5A, during the inactive mode of operation, the bias signal generator circuit according to the present disclosure (e.g., 500C-500F) actively generates positive and negative voltages (e.g., $V_{DD}$ and $V_{SS}$) having respective magnitudes that are large enough (e.g., one volts or greater) for controlling states of internal (switch) elements (e.g., SW of FIG. 2A) of an RF antenna switch (e.g., 150, 250 of FIG. 2A) to a known (designed for low RSE) state that corresponds to the OFF state (e.g., $SW_{OFF}$ of FIG. 2B). This can be seen in the timing diagram (500G) of FIG. 5G, to be read in view of, and contrasted to, description of the timing diagram (200B) of FIG. 2B, that shows the inactive state, $SW_{INACT}$, of the switch element (e.g., SW of FIG. 2A) as defined by states, $TS_{OFF}$ and $SS_{ON}$, of the respective through and shunt stacks, TS and SS, of FIG. 2A. In other words, because levels (e.g., $V_{DD}$ and $V_{SS}$) of the control voltages, $V_{CTL-TS}$ and $V_{CTL-SS}$, during the inactive mode are/remain sufficiently high, then, as shown in FIG. 5G, the through stack, TS, can be controlled to the OFF state, $TS_{OFF}$, and shunt stack, SS, can be controlled to the ON state, $SS_{ON}$, to effectively isolate the common port, AP, from the throws (e.g., S1, S2, . . . , Sk of FIG. 2A) of the RF antenna switch.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A radio frequency (RF) antenna switch, comprising:

a first switch element coupled between a common port of the RF antenna switch and a first throw of the RF antenna switch, the first switch element comprising:

a through stack comprising a plurality of N-type FET transistors arranged in series connection, the through stack coupled between the common port and the first throw; and a shunt stack comprising a plurality of N-type FET transistors arranged in series connection, the shunt stack coupled between the first throw and a reference ground, and a bias signal generation circuit comprising at least one charge pump, the bias signal generator configured to generate positive and negative bias voltages based on a positive supply voltage, wherein the RF antenna switch is configured to operate according to an active mode and an inactive mode, the inactive mode defining a low power consumption mode of the RF antenna switch, control voltages applied to the first switch element during the active mode comprise positive and negative voltages having the respective magnitudes of the positive and negative bias voltages, the control voltages applied to the first switch element during the inactive mode comprise positive and negative voltages having respective magnitudes that are greater than zero and smaller than the respective magnitudes of the positive and negative bias voltages, and during the inactive mode, the at least one charge pump is inactive.

2. The radio frequency (RF) antenna switch according to claim 1, wherein:

the positive voltage of the control voltages applied to the first switch element during the inactive mode is the positive supply voltage, and the negative voltage of the control voltages applied to the first switch element during the inactive mode is an inverted version of the positive supply voltage having a magnitude that is substantially equal to a magnitude of the positive supply voltage.

3. The radio frequency (RF) antenna switch according to claim 2, further comprising:

a positive bias signal switch that is configured to selectively output one of the positive bias voltage or the positive supply voltage; and a negative bias signal switch that is configured to selectively output one of the negative bias voltage or the inverted version of the positive supply voltage.

4. The radio frequency (RF) antenna switch according to claim 1, wherein:

the control voltages applied to the first switch during the inactive mode are configured to control the through stack to an OFF state and the shunt stack to an ON state to isolate the common port from the first throw.

5. The radio frequency (RF) antenna switch according to claim 1, wherein:

the plurality of N-type FET transistors of the through stack comprises at least one intrinsic N-type FET transistor.

6. The radio frequency (RF) antenna switch according to claim 1, wherein:

the plurality of N-type transistors of the shunt stack comprises at least one intrinsic N-type transistor.

7. The radio frequency (RF) antenna switch according to claim 6, wherein:

the plurality of N-type transistors of the through stack or of the shunt stack comprises at least one regular N-type transistor.

8. The radio frequency (RF) antenna switch according to claim 1, wherein:

each transistor of the plurality of N-type transistors of the through stack or of the shunt stack is an intrinsic N-type transistor.

9. The radio frequency (RF) antenna switch according to claim 1, wherein:

each transistor of the plurality of N-type transistors of the through stack and of the shunt stack is an intrinsic N-type transistor.

10. The radio frequency (RF) antenna switch according to claim 1, wherein:

the plurality of N-type FET transistors of the through stack comprises at least one regular N-type FET transistor.

11. The radio frequency (RF) antenna switch according to claim 1, wherein:

the plurality of N-type transistors of the shunt stack comprises at least one regular N-type transistor.

12. The radio frequency (RF) antenna switch according to claim 1, wherein:

each transistor of the plurality of N-type transistors of the through stack or of the shunt stack is a regular N-type transistor.

13. The radio frequency (RF) antenna switch according to claim 1, wherein:

each transistor of the plurality of N-type transistors of the through stack and of the shunt stack is a regular N-type transistor.

14. The radio frequency (RF) antenna switch according to claim 1, wherein:

the respective magnitudes of the positive and negative bias voltages are greater than three.

15. The radio frequency (RF) antenna switch according to claim 1, wherein:

the respective magnitudes of the positive and negative voltages of the control voltages applied to the first switch element during the inactive mode are greater than one.

16. The radio frequency (RF) antenna switch according to claim 1, wherein:

the bias signal generation circuit further comprises a negative voltage generator configured to generate a negative supply voltage based on the positive supply voltage, the at least one charge pump includes a negative charge pump for generation of the negative bias voltage based on the negative supply voltage, and during the inactive mode, the negative voltage generator is active for provision of the negative voltage of the control voltages.

17. The radio frequency (RF) antenna switch according to claim 1, further comprising a first negative voltage generator configured to generate a first negative supply voltage based on the positive supply voltage, wherein:

the bias signal generation circuit further comprises a second negative voltage generator configured to generate a second negative supply voltage based on the positive supply voltage, the at least one charge pump includes a negative charge pump for generation of the negative bias voltage based on the second negative supply voltage, and during the inactive mode, the first negative voltage generator is active for provision of the negative voltage of the control voltages, and the second negative voltage generator is inactive.

18. The radio frequency (RF) antenna switch according to claim 17, wherein:

during the active mode, the first negative voltage generator is inactive, and the second negative voltage generator is active.

19. A radio frequency (RF) antenna switch, comprising:

a first switch element coupled between a common port of the RF antenna switch and a first throw of the RF antenna switch, the first switch element comprising:

a through stack comprising a plurality of intrinsic N-type FET transistors and at least one regular N-type FET transistor arranged in series connection, the through stack coupled between the common port and the first throw; and a shunt stack comprising a plurality of intrinsic N-type FET transistors arranged in series connection, the shunt stack coupled between the first throw and a reference ground; wherein:

the RF antenna switch is configured to operate according to an active mode and an inactive mode, the inactive mode defining a low power consumption mode, and control voltages applied to the first switch element during the active mode comprise positive and negative voltages having respective magnitudes that are greater than one, and the control voltages applied to the first switch element during the inactive mode have a magnitude of zero.

20. A radio frequency (RF) antenna switch, comprising:
a first switch element coupled between a common port of the RF antenna switch and a first throw of the RF antenna switch, the first switch element comprising a through stack and a shunt stack,
    the through stack comprising a plurality of intrinsic N-type FET transistors and at least one regular N-type FET transistor arranged in series connection, the through stack coupled between the common port and the first throw, and
    the shunt stack comprising a plurality of intrinsic N-type FET transistors arranged in series connection, the shunt stack coupled between the first throw and a reference ground,
wherein:
the RF antenna switch is configured to operate according to an active mode and an inactive mode, the inactive mode defining a low power consumption mode,

control voltages applied to the first switch element during the active mode consist of positive and negative voltages having respective magnitudes that are greater than one, and the control voltages applied to the first switch element during the inactive mode have a magnitude equal to zero.

21. The radio frequency (RF) antenna switch according to claim 20, further comprising:

a bias signal generation circuit comprising at least one charge pump configured to generate the positive and/or negative voltages during the active mode based on a supply voltage, wherein during the inactive mode, the at least one charge pump is inactive, thereby causing the respective magnitudes of the positive and/or negative voltages to settle to zero.

* * * * *